(12) United States Patent
Bhandarkar et al.

(10) Patent No.: US 9,792,002 B2
(45) Date of Patent: *Oct. 17, 2017

(54) MULTIPLE STAKEHOLDERS FOR A SINGLE BUSINESS PROCESS

(75) Inventors: Mangesh P. Bhandarkar, Mountain View, CA (US); Michael K. Dewey, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 13/619,976

(22) Filed: Sep. 14, 2012

(65) Prior Publication Data

US 2013/0047090 A1    Feb. 21, 2013

Related U.S. Application Data

(63) Continuation of application No. 11/014,149, filed on Dec. 15, 2004, now Pat. No. 9,645,712.

(60) Provisional application No. 60/615,306, filed on Oct. 1, 2004.

(51) Int. Cl.
| | |
|---|---|
| *G06F 17/30* | (2006.01) |
| *G06F 3/0484* | (2013.01) |
| *G06Q 10/10* | (2012.01) |
| *G06F 3/048* | (2013.01) |

(52) U.S. Cl.
CPC ............ *G06F 3/0484* (2013.01); *G06F 3/048* (2013.01); *G06Q 10/10* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Non-Final Office Action from U.S. Appl. No. 13/802,396, dated Apr. 9, 2015.

(Continued)

*Primary Examiner* — Hung Le
(74) *Attorney, Agent, or Firm* — Meyertons, Hood, Kivlin, Kowert & Goetzel, P.C.

(57) ABSTRACT

Methods and apparatus, including computer program products, implementing and using techniques for providing a customized representation of a business process involving one or more organizational entities that are accessible through a network. A user interface that can display a customized representation of a business process is provided. User information, including user privileges associated with the business process, is stored in a central repository that is accessible through the network. A request to view the business process is received from a first user through the user interface. The user privileges for the first user are retrieved from the central repository. A customized representation of the business process is displayed with the user interface. The customized representation is in compliance with the retrieved user privileges for the first user.

20 Claims, 17 Drawing Sheets

(56) References Cited

U.S. PATENT DOCUMENTS

| | | | |
|---|---|---|---|
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,278,977 B1* | 8/2001 | Agrawal | G06Q 10/10 705/7.27 |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| 6,338,074 B1* | 1/2002 | Poindexter | G06Q 10/10 709/231 |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,725,445 B1* | 4/2004 | Leymann | G06F 9/542 700/101 |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,751,657 B1* | 6/2004 | Zothner | G06F 9/542 709/203 |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,024,669 B1* | 4/2006 | Leymann | G06Q 10/0633 705/7.27 |
| 7,027,997 B1* | 4/2006 | Robinson | G06Q 10/06311 705/7.13 |
| 7,062,502 B1 | 6/2006 | Kesler | |
| 7,065,493 B1* | 6/2006 | Homsi | 705/7.26 |
| 7,069,231 B1 | 6/2006 | Cinarkaya et al. | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,399 B1* | 8/2008 | Racca | G06Q 10/06 705/7.27 |
| 7,412,455 B2 | 8/2008 | Dillon | |
| 7,448,046 B2* | 11/2008 | Navani et al. | 719/316 |
| 7,508,789 B2 | 3/2009 | Chan | |
| 7,516,191 B2 | 4/2009 | Brouk et al. | |
| 7,577,953 B1* | 8/2009 | Verego et al. | 718/100 |
| 7,590,685 B2 | 9/2009 | Palmeri et al. | |
| 7,620,655 B2 | 11/2009 | Larsson et al. | |
| 7,689,711 B2 | 3/2010 | Brouk et al. | |
| 7,698,160 B2 | 4/2010 | Beaven et al. | |
| 7,739,351 B2 | 6/2010 | Shkvarchuk et al. | |
| 7,766,324 B2* | 8/2010 | Tamura | B65H 31/10 271/213 |
| 7,779,039 B2 | 8/2010 | Weissman et al. | |
| 7,788,399 B2 | 8/2010 | Brouk et al. | |
| 7,890,544 B2* | 2/2011 | Swartz et al. | 707/803 |
| 7,904,882 B2 | 3/2011 | Hinks | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,775,654 B2 | 7/2014 | Shkvarchuk et al. | |
| 2001/0007976 A1* | 7/2001 | Thompson et al. | 705/7 |
| 2001/0044738 A1* | 11/2001 | Elkin | G06F 8/34 705/7.15 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0040312 A1* | 4/2002 | Dhar | A61J 9/00 705/7.26 |
| 2002/0040339 A1* | 4/2002 | Dhar et al. | 705/38 |
| 2002/0042264 A1 | 4/2002 | Kim | |
| 2002/0042843 A1 | 4/2002 | Diec | |
| 2002/0065701 A1* | 5/2002 | Kim | G06Q 10/06311 705/7.13 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0138577 A1* | 9/2002 | Teng et al. | 709/205 |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0050800 A1* | 3/2003 | Brandt et al. | 705/2 |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0078957 A1* | 4/2003 | Cheeniyil | G06Q 10/0633 709/201 |
| 2003/0120675 A1 | 6/2003 | Stauber et al. | |
| 2003/0126001 A1* | 7/2003 | Northcutt | G06Q 10/04 705/7.15 |
| 2003/0144860 A1* | 7/2003 | Casati et al. | 705/1 |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |

(56) References Cited

U.S. PATENT DOCUMENTS

| | | |
|---|---|---|
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0025048 A1* | 2/2004 | Porcari et al. ............... 713/200 |
| 2004/0027388 A1 | 2/2004 | Berg et al. |
| 2004/0098154 A1* | 5/2004 | McCarthy ............... G06F 17/50 700/97 |
| 2004/0103014 A1* | 5/2004 | Teegan et al. .................... 705/8 |
| 2004/0128001 A1 | 7/2004 | Levin et al. |
| 2004/0162741 A1* | 8/2004 | Flaxer et al. .................... 705/7 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0205075 A1* | 10/2004 | LaTurner ............... G06Q 10/10 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0216555 A1* | 9/2005 | English et al. ............... 709/204 |
| 2005/0223022 A1 | 10/2005 | Weissman et al. |
| 2006/0020641 A1* | 1/2006 | Walsh .................... G06Q 10/10 |
| 2006/0021019 A1 | 1/2006 | Hinton et al. |
| 2006/0059423 A1* | 3/2006 | Lehmann et al. ............. 715/530 |
| 2006/0069605 A1* | 3/2006 | Hatoun .................. G06Q 10/06 705/7.15 |
| 2006/0143591 A1* | 6/2006 | Hilerio ................... G06Q 10/06 717/101 |
| 2007/0129979 A1* | 6/2007 | Kumagai ............... G06Q 10/06 705/7.28 |
| 2007/0136357 A1* | 6/2007 | van Wyk ............... G06Q 10/06 |
| 2007/0143736 A1* | 6/2007 | Moriarty ................ G06Q 10/06 717/100 |
| 2007/0174342 A1* | 7/2007 | Maeda .................. G06Q 10/10 |
| 2008/0114475 A1* | 5/2008 | Wiersema .............. G06Q 30/02 700/90 |
| 2008/0249972 A1 | 10/2008 | Dillon |
| 2008/0306806 A1* | 12/2008 | Van Wyk ............... G06Q 10/06 705/7.26 |
| 2008/0307392 A1* | 12/2008 | Racca ....................... G06F 8/34 717/120 |
| 2008/0313003 A1* | 12/2008 | Racca .................... G06Q 10/06 705/7.26 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0187453 A1* | 7/2009 | Dill .................... G06Q 10/0631 705/7.12 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0254291 A1* | 10/2012 | Feldman ................ G06Q 10/06 709/203 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0246933 A1 | 9/2013 | Bhandarkar et al. |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

Non-Final Office Action from U.S. Appl. No. 13/886,206, dated May 15, 2015.
Notice of Allowance from U.S. Appl. No. 13/886,206, dated Aug. 27, 2015.
Notice of Allowance from U.S. Appl. No. 13/802,396, dated Sep. 15, 2015.

* cited by examiner

MULTIPLE STAKEHOLDERS FOR A SINGLE BUSINESS PROCESS

CROSS-REFERENCE TO RELATED APPLICATIONS

The present application is a continuation of U.S. application Ser. No. 11/014,149, filed Dec. 15, 2004, which claims priority from U.S. Provisional Patent Application No. 60/615,306, filed Oct. 1, 2004, the entire disclosure of which is incorporated herein by reference for all purposes. The present application is also related to U.S. patent application Ser. No. 10/820,650 entitled "TECHNIQUES FOR PROVIDING INTEROPERABILITY AS A SERVICE" filed on Apr. 7, 2004, to U.S. patent application Ser. No. 10/727,089 entitled "APPARATUS AND METHODS FOR PROVISIONING SERVICES" filed Dec. 2, 2003, and to U.S. patent application Ser. No. 10/849,602 entitled "TECHNIQUES FOR PROVIDING CONNECTIONS TO SERVICES IN A NETWORK ENVIRONMENT" filed May 19, 2004, the entire disclosures of which are incorporated herein by reference for all purposes.

BACKGROUND

This invention relates to defining and modifying business processes.

A business process can be described as a series of specific events in a chain of structured business activities performed by one or more organizational entities. The business process typically changes the state of some business related data and/or a product and generates some type of output. Examples of different types of business processes include receiving orders, invoicing, shipping products, updating employee information, setting a marketing budget, and so on. Business processes occur at all levels of an organization's activities and can include both events that a customer can see and events that are invisible to the customer.

Organizations and businesses often implement business process flows in computer systems, in order to increase the efficiency with which a business process is performed, and to minimize the risk of errors occurring in the course of performing the business process. Implementing business process flows in computer systems also typically makes the business process flow more efficiently and allows a larger volume of data, such as purchase orders, invoices, and so on, to be processed by the computer system in a time-efficient and low-cost manner, compared to a situation in which some or all parts of the business process are performed manually by individuals.

There is a wide range of commercially available software products for creating and managing business process flows. Some examples include: the BEA WebLogic Workshop product by BEA Systems of San Jose, Calif.; the Collaxa 2 product by Collaxa, Incorporated of Redwood Shores, Calif.; the WebSphere product by International Business Machines, Incorporated, of Somers, N.Y.; the Microsoft BizTalk Server product by Microsoft Corporation of Redmond, Wash.; and the Sun Web Service Choreography Interface (WSCI) Editor product by Sun Microsystems, Incorporated of Santa Clara, Calif.

Typically, multiple individuals are involved in the development of a single business process. For example a business analyst may define at a high level what a business process should look like. A developer may look at the business process from the viewpoint of making sure that all the systems involved in the business process get the necessary input so the systems can perform the necessary tasks involved in the business process. An information technology (IT) person may look at the business process from the viewpoint of determining whether the business process satisfies all the IT departments policies, for example, regarding security, and so on.

At present, there is typically no way for the individuals that are involved in the development of a business process to view only the particular aspects of the business process in which they are involved. It would thus be desirable to have a way to control what type of information is presented to different users, in order to facilitate the development of the business process. It would also be desirable to control what specific operations different users can perform on the business process in the development of the business process.

SUMMARY

In general, in one aspect, the invention provides methods and apparatus, including computer program products, implementing and using techniques for providing a customized representation of a business process involving one or more organizational entities that are accessible through a network. A user interface that can display a customized representation of a business process is provided. User information, including user privileges associated with the business process, is stored in a central repository that is accessible through the network. A request to view the business process is received from a first user through the user interface. The user privileges for the first user are retrieved from the central repository. A customized representation of the business process is displayed with the user interface. The customized representation is in compliance with the retrieved user privileges for the first user.

Advantageous implementations can include one or more of the following features. A request to modify the business process can be received from the first user through the user interface; the modification of the business process can be performed when the requested modification complies with the retrieved user privileges; and the modification of the business process can be denied when the requested modification does not comply with the retrieved user privileges. The first user can be associated with a role and the role can have an associated set of user privileges. The role can represent an individual user, or an organizational entity including two or more individual users. The role can be a business analyst role, a developer role, an information technology professional role, a quality assurance tester role, a security or business auditor role, or a performance analyst role. A request to view the business process can be received through the user interface from a second user that collaborates with the first user with respect to the business process; the user privileges can be retrieved for the second user from the central repository, where the user privileges for the second user are different from the user privileges for the first user; and the user interface can display a customized representation of the business process, which is in compliance with the retrieved user privileges for the second user.

The user privileges can include privileges to do one or more of: creating a new business process, viewing an existing business process, modifying an existing business process, importing elements of one business process into another business process, copying elements from one business process into another business process, and viewing reports generated by the business process. The business process can be defined in an extended markup language. Storing user information can include storing user privileges for a user in a privilege storage area of the central repository, which is associated with a user account for the user. The user's privilege storage area can include one or more sets of user privileges, where each set of user privileges corresponds to a particular business process. The business process can include a description of what types of user privileges are needed in order to view the business process. The network can be an interoperability network including functionality for routing messages through the interoperability network, and functionality for mediating differences in communication protocol formats between users, services, and computer applications involved in the business process.

In general, in another aspect, the invention provides a system for providing a customized representation of a business process involving one or more organizational entities that are accessible through a network. The system includes a network, a central repository, and a process design application. The network connects several network nodes, where each network node is associated with an organizational entity and represents a user, a service, or a computer application. The central repository is accessible through the network and stores user information, including user privileges associated with the business process. The process design application runs at one of the network nodes and provides a user interface for displaying a customized representation of a business process, receives a request from a first user through the user interface to view the business process, retrieves the user privileges for the first user from the central repository, and displays with the user interface a customized representation of the business process, where the customized representation is in compliance with the retrieved user privileges for the first user.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
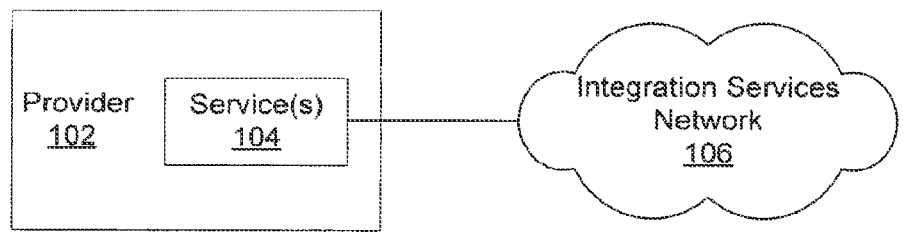
FIG. 1A shows the provisioning of a service for use over an interoperability network.

An Overview of the Interoperability Network Functionalities

The present invention provides methods and apparatus, including computer program products, for defining, executing and managing business processes that integrate several services in order to solve a business problem.

The invention will be described in detail with reference to specific implementations including the best modes contemplated by the inventors for carrying out the invention. Examples of these specific implementations are illustrated in the accompanying drawings. While the invention is described in conjunction with these specific implementations, it will be understood that this description is not intended to limit the invention to the described implementations. On the contrary, the description is intended to cover alternatives, modifications, and equivalents as may be included within the spirit and scope of the invention. In the following description, specific details are set forth in order to provide a thorough understanding of the present invention. The present invention can be practiced without some or all of these specific details. In addition, well known features or details may not have been described to avoid unnecessarily obscuring the invention.

According to various implementations of the invention, an interoperability network (106) is provided which facilitates interoperability and implementation of business processes using, among other things, a wide variety of web services technologies and standards including, for example, Simple Object Access Protocol (SOAP), Web Services Description Language (WSDL), WS-Security, WS-Policy, and Business Process Execution Language (BPEL). The interoperability network (106) mediates the technology differences in data formats, communications protocols and business policies through a set of established and defined policies.

In general, the term 'web service' refers to a collection of technology standards that enable software applications of all types to communicate over a network. A web service typically facilitates a connection between two applications or services in which queries and responses are exchanged in XML (eXtended Markup Language) over HTTP (Hyper Text Transfer Protocol) or HTTPS (Secure HTTP). More specifically, the term web services implies the implementation of a stack of specific, complementary standards.

Although not specifically tied to any transport protocol, web services build on Internet connectivity and infrastructure to ensure nearly universal reach and support. In particular, web services take advantage of HTTP, the same connection protocol used by Web servers and browsers.

XML (and its corresponding semantics) is a widely accepted format for exchanging data, and is a fundamental building block for nearly every other layer in the web services stack. SOAP is a protocol for messaging between applications. SOAP is based on XML and uses common Internet transport protocols, such as HTTP, to carry its data. Web Services Description Language (WSDL) is an XML-based description of how to connect to and communicate with a particular web service. A WSDL description abstracts a particular service's various connection and messaging protocols into a high-level bundle and forms a key element of the UDDI directory's service discovery model. Finally, Universal Description, Discovery, and Integration (UDDI) represents a set of protocols and a public directory for the registration and real-time lookup of web services and other business processes. Various implementations of the invention employ these and similar technologies to provide interoperability in a business process between and among disparate platforms, services or applications as a service.

Specific mechanisms by which the interoperability network (106) can facilitate interaction among a variety of entities will now be described with reference to the accompanying figures. It will be understood that the mechanisms described are merely examples of techniques that can be employed to facilitate the basic functionalities of such interoperability networks. That is, any technologies that facilitate "on-demand" access to a wide range of services are within the scope of the invention.

FIG. 1 illustrates the provisioning of a service (104) through a network in accordance with one implementation of the present invention. As shown, the network includes an interoperability network (106) for facilitating the provisioning of services for use by entities having access to the interoperability network (106). In a specific example, a service (or set of services) (104) is provisioned by a service provider (102) in conjunction with interoperability network (106). During the provisioning process, format connection, and security preferences can be specified for messages received by the services (104) as further described below. In one implementation, provisioning includes setting up a service configuration such that the service (104) can be used in the interoperability network (106). As part of this set up, the services (104) can specify the type of message format they prefer to receive. The respective services (104) can reside either inside or outside the firewall of their service providers (102).

In some implementations, the service provider (102) can optionally specify which users or services can access the provisioned service (104) and the conditions under which they can have access. It should be recognized that the services (104) can be provided by the service provider (102) to any type of entity such as, for example, an individual user from a particular organization or a particular organizational entity. An entity can represent a distinct business entity, a particular user within a business entity, or an administrative domain of a computer application.

As used herein, the term "service" can represent any computer application, process, entity, or device accessible to other applications, processes, entities, or devices through an interface such as an application programming interface (API), user interface, or Internet web user interface by any of a variety of protocols over a network within an entity or over the Internet. A service can also comprise multiple methods or applications on a single device or distributed across multiple devices.

Although not shown in FIG. 1, a service provider (102) can provision any number and type of services (104). Also, any number and type of service providers (102) can provision services (104) to be accessed through the interoperability network (106). Accordingly, the interoperability network (106) can be configured to provision multiple services (104) from multiple service providers (102). A specific example of how service providers can provision services has been described in U.S. patent application Ser. No. 10/727,089 entitled "APPARATUS AND METHODS FOR PROVISIONING SERVICES" filed Dec. 2, 2003, and incorporated herein by reference above.

After services (104) are provisioned, messages can then be sent between one or more services (104) through the interoperability network (106). That is, a particular service (104) can be accessed by another service through the interoperability network (106). For example, a user associated with a first device can access a particular service on a second device through the interoperability network (106) using a communication process (or service) located on the first device.

Figure 1B:
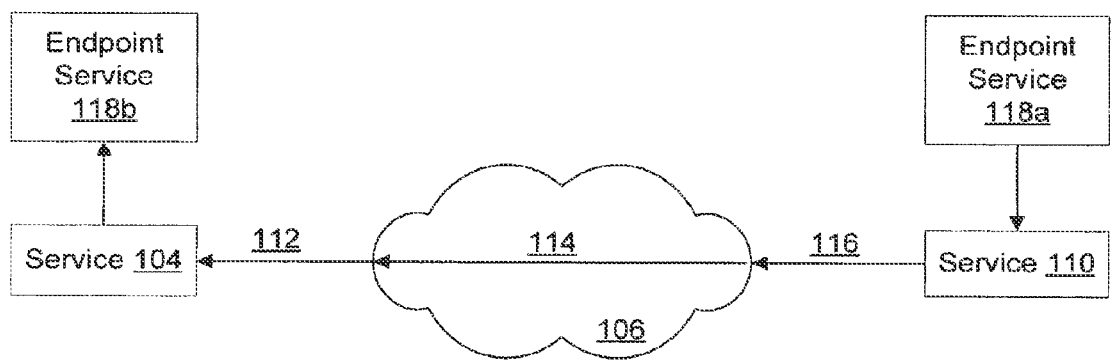
FIG. 1B shows the mediation of messages sent from a first service to a second service through an interoperability network in accordance with one embodiment of the present invention.

FIG. 1B illustrates the mediation of messages sent from a first service (110) to a second service (104) through an interoperability network (106) in accordance with a particular implementation of the present invention. As shown, a message is being sent from a first service (110) to a second service (104) through the interoperability network (106), which is accessible over a wide area network such as, for example, the Internet. Such a message can correspond to a request from a user associated with the first service (110) for access to the second service (104), which resides on a remote device. The request can be sent to the second service (104) by a web application (for example, the first service (110)) located on another remote device. In particular cases, the first service (110) and second service (104) can be configured to execute on their own and a user is not required to send a request or message to a particular service.

In one configuration, the interoperability network (106) can include any number of mechanisms for mediating communications between two or more services (110; 104). In the illustrated implementation, the interoperability network (106) includes a mechanism for translating messages sent between the services (110; 104). Messages can use formats such as MIME (Multipurpose Internet Mail Extension), DIME (Direct Internet Message Encapsulation), and the like, with AS2 (Applicability Statement 2), SOAP, and other application bindings. MIME and DIME are attachment/part formats, while SOAP and AS2 are application logic binding protocols. Of course, a message can use any suitable type of protocol, structuring, or formatting specification, which results in a particular format for the message. When different entities use different formats for their messages, the interoperability network (106) translates the messages such that recipients receive the messages in the appropriate format.

In an exemplary implementation, a message having a MIME format is sent by the first service (110) and received into the interoperability network (106) through a first routing path (116). Of course, the first routing path (116) can include any number and type of routers and/or processing nodes. The interoperability network (106) then determines, for example, through policies in the directory, that the second service (104) expects messages to be received in a DIME format and translates the message from MIME to DIME along a second routing path (114). The second routing path (114) can include any number and type of routing devices (or services) and/or processing device (or services). The translated message, which is now in DIME format, is then sent to the second service (104) through a third routing path (112), which can include any suitable number and type of routing devices and/or processing nodes.

In addition to transformation of messages, any number of other enrichments can be applied to messages in the interoperability network (106). Such enrichments can include, for example, a digital signature service, a tariff calculator for a purchase order, and so on.

According to various implementations, the first service (110) and the service provider of the first service (110) need not be aware of the message format requirements of the message destination (that is, the second service (104)), nor of any format translation taking place in the interoperability network (106). The first service (110) can send the message as if the second service (104) employed the same message format as used by the first service (110).

In addition to providing mechanisms for provisioning services and mediating messages sent to such services, the interoperability network (106) also preferably includes a repository or a directory for storing various information regarding the services (110; 104) and entities that provision and/or use such services. This information can include, for example, user identities, service identities and policies, that control which entities in the interoperability network (106), can interact, and the manner in which the entities can interact. The interoperability network (106) can also include mechanisms for creating and combining services, registering users and their identifying information, and handling messages routed between services (110; 104) and/or users. The repository can be formed from one or more databases or directory services, including LDAP, or the like stored on one or more memory devices on one or more computing platforms.

In some implementations of the invention, the interoperability network (106) provides security management including authentication, authorization and security policy enforcement using the information in the directory and policy framework. The interoperability network (106) can perform security management at various points in a message's network lifecycle, for example, when a message is sent into the interoperability network (106) from a service (104), when the message is routed to its destination endpoint (118b), and when the message is delivered out of the interoperability network (106) to its destination service (104). While the following discussion employs the term "service," it will be understood that this is intended to include all application and software entities capable of connecting to and interacting with the interoperability network (106), in particular in order to carry out a business process.

Authentication is the process of verifying that users or services (110; 104) interacting through the interoperability network (106) have valid network identities. The authentication process can involve the interoperability network (106) supplying credentials required by the service (110; 104) to identify the interoperability network (106). Authorization is the process of making sure a service (110) has permission to exchange messages with another service (104). Security policy enforcement allows services (110; 104) to specify the level of security other services (110; 104) must employ to interact with them through the interoperability network (106). For example, if the first service (110) has a security policy of required encryption for data and required password authorization or better, then only services connecting to the interoperability network (106) with a connection security policy that requires at least data encryption will be allowed to exchange messages with the first service (110). In another implementation, if the first service (110) has a security policy of required encryption for data and ssh authentication with a key of 1024 bits or higher, then only services connecting to the interoperability network (106) with a key of 1024 bits or higher will be allowed to exchange messages with the first service (110). Service providers (102) can define equivalent security policies, allowing the interoperability network (106) to consider certain policies to be equivalent to others, though they are not the same, for the purpose of gaining access to services (110; 104).

According to a specific implementation, a service identity is the network service address of an interoperability network endpoint (118a) with which the connecting service (110) is associated. The service proof is the password configured for the associated endpoint. The user identity is a combination of organization and user name. Optionally a service name can be provided with the user identity. The user identity associates the connecting service (110) with the corresponding network user account.

When a service (110; 104) posts a message to the interoperability network (106) or polls for a message, the service (110; 104) initiates a connection to the interoperability network (106). The service (110; 104) is authenticated and associated with an endpoint (118a; 118b) on the interoperability network (106). The interoperability network (106) verifies that the connection security policy of the connecting service is at least as high as the connection security policy defined by the associated endpoint. If the authentication and security policy checks pass for a posted message, the message is accepted into the interoperability network (106) and is ready to be routed. Otherwise the message is not accepted and a fault, such as a SOAP fault, is returned to the service. If the service (110; 104) is polling for a message and verification succeeds, the message requested by the poll is delivered to the service. If security verification fails, a fault is returned to the service (110; 104) and the polled for message is not delivered.

When connecting to the interoperability network (106) the service (110; 104) supplies a username that identifies the service (110: 104) as an identity on the interoperability network (106). The provided identity associates the connecting service (110; 104) with an endpoint service (118a; 118b) on the interoperability network (106). In addition, the service (110; 104) supplies a password and/or a client certificate as proof of that identity. In the case of HTTPS connections, the interoperability network (106) provides a server certificate that can be used by the service for authentication of the interoperability network (106).

As mentioned above, each service (110; 104) must connect with a security level that is the same or higher than the connection security policy configured for the service's associated endpoint service (118a; 118b) which can be configured, for example, for HTTP, HTTPS (HTTP with encryption) or HTTPS with certificate-based authentication.

The interoperability network (106) determines the endpoint (118a; 118b) associated with a message and routes the message to a message queue associated with that endpoint (118a; 118b). During this routing phase, security policy and permission verification is performed. If the security policy and permission verification passes, the message is routed to the message queue associated with the destination endpoint (118a, 118b). If either part of the verification does not pass, the message is not routed and a fault is returned to the service (110; 104) that originated the message.

Security policies are enforced in a bi-directional manner. That is the security policy of the connecting service's endpoint (that is, the origin endpoint (118a)) and the security policy of the destination service's endpoint (that is, the destination endpoint (118b)) must both be met. For example, if the origin endpoint (118a) has a security policy of HTTP, the origin endpoint (118a) will allow services (110; 104) that use HTTP or HTTPS to connect. However, the only endpoints the origin endpoint (118a) will be allowed to message with are endpoints with a security policy that allows HTTP. That is, endpoints with a security policy of HTTPS or higher will not allow services that connect with HTTP to message with the service associated with them.

Permission enforcement can also performed during the message routing phase. The destination endpoint has a permissions or access control list policy that is stored in the directory that the interoperability network (106) references to determine whether or not the origin endpoint (118a) is allowed to exchange messages with this destination endpoint (118b).

When the interoperability network (106) pushes a message to a destination service (104), the interoperability network (106) can perform authentication of the service (104), can provide authentication credentials to the service (104), and will enforce the connection security policy configured for the endpoint corresponding to the destination service (104). If authentication verification and security policy validation succeed, the message is delivered to the destination service (104). If either security verifications fail, the message is not delivered and a fault can be returned to the service (110) that originated the message.

When connecting from the interoperability network (106) to a destination service (104), the interoperability network (106) can be configured to provide no authentication credentials, to supply a username and/or password, or to authenticate using a digital certificate (for example, a Verisign™ X.509 certificate) sent by the destination service (104) to the interoperability network (106). In addition, the interoperability network (106) can be configured to supply a digital certificate, which the destination service (104) can use to authenticate the interoperability network (106). It will be understood that the foregoing description relating to security management is merely exemplary and that any suitable alternatives for providing any combination of the described functionalities are within the scope of the invention.

Business Processes

As can be understood from the foregoing discussion, the features of the interoperability network (106) lend themselves particularly well to implementing business processes, as the interoperability network (106) enables the necessary underlying protocol functionality and mediates any differences in protocol formats between various services (110; 104) and applications. It should be noted, however, that at least some embodiments described herein may be implemented in any of a wide variety of conventional and proprietary network environments.

Business processes can be defined in numerous ways on the interoperability network (106). In one implementation, the interoperability network (106) provides three major mechanisms for defining business processes. The first mechanism is referred to as "Composite Services" and involves linking services (104; 110) together to form a higher order service that has a well-defined interface and performs a well-defined function. The second mechanism is referred to as "Connectors" and involves taking existing service definitions and exposing them through different transport protocols. The third mechanism is referred to as "Business Processes" and involves linking groups of services together to perform a business function. A business process can be composed of other business processes, can use composite services, and can also use connectors. A Business process may involve human interactions. Such a business process is often commonly referred to as a "workflow." Each of these above process definitions has a different user focal point. As will be seen below, a Process Designer tool that can be used to design business processes may have different "modes" depending on the operation the user is trying to perform.

Figure 2:
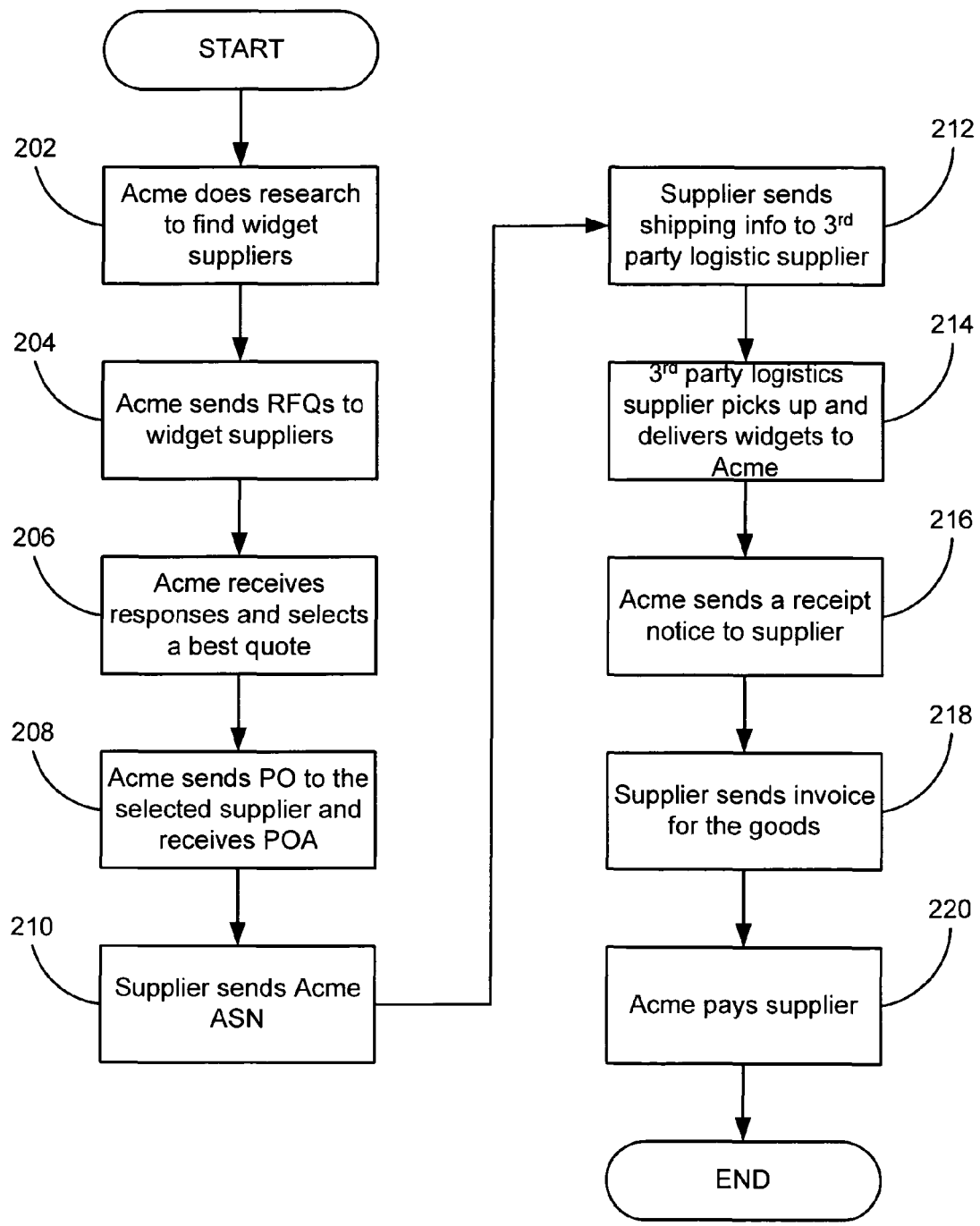
FIG. 2 is a schematic block diagram showing a complete public business process for supply-chain management for a product manufacturing company.
Figure 3:
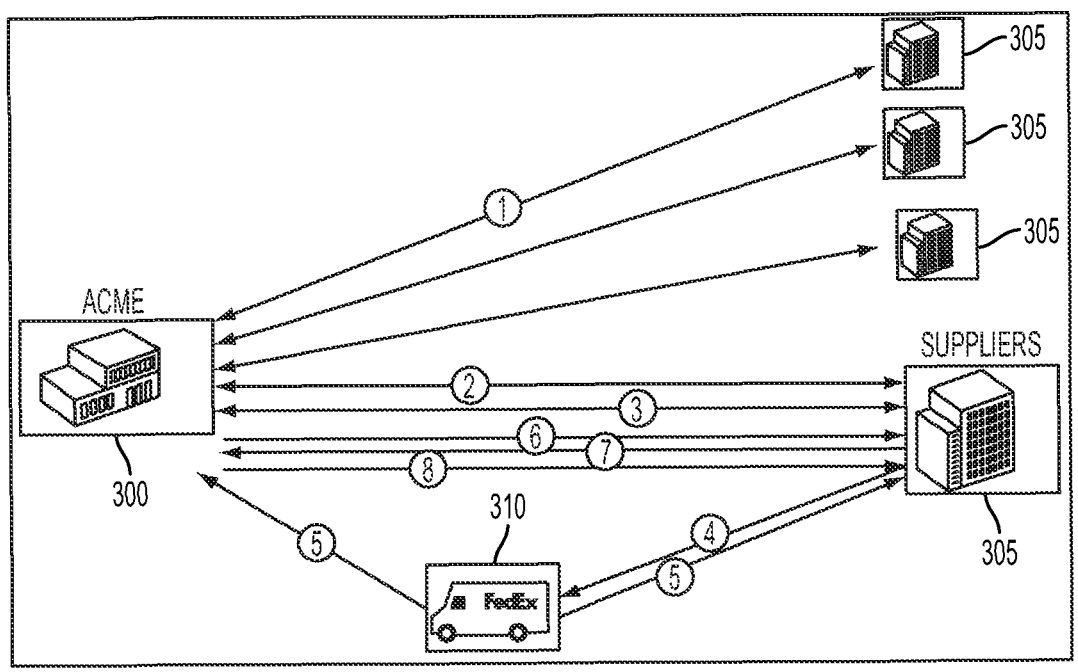
FIG. 3 is a schematic diagram showing the interaction between the entities involved in the business process of FIG. 2.

FIGS. 2 and 3 show an exemplary public business process for supply-chain management for a product manufacturing company. The business process scenario involves ACME Products company (300) "ACME" that wants to buys widgets from a third party supplier (305) of widgets in order to incorporate the widgets into its product. A Business Analyst at ACME (300) has defined the business process (200) and the necessary business rules in order to outsource widgets from a third party supplier (305). The business process can be implemented, for example, on the interoperability network (106). For simplicity all the third party suppliers (305) and ACME (300) are assumed to be provisioned on the interoperability network (106). As the skilled reader realizes, this simplifying assumption can be relaxed in other implementations to include provisioning of end-points on the interoperability network (106), as has been discussed above.

As can be seen in FIG. 2, the business process (200) starts by ACME (300) doing research to find out suppliers (305) for the particular type of widget ACME needs (step 202). This can be done, for example, by manually searching through parts catalogs, or by automatically querying the directory on the interoperability network (106). ACME (300) then sends a Request For Quote (RFQ) to each supplier (305) that was found (step 204). Some of the suppliers (305) respond to the RFQ with a quote for the widget and ACME (300) selects a "best quote" among the responses to the RFQ (step 206). The definition of "best" is can be both qualitative and quantitative, for example, lowest cost, fastest delivery times, and so on.

Next, ACME (300) sends a Purchase Order (PO) to the selected supplier (305), which acknowledges the PO with a PO Acceptance (POA) (step 208). In some implementation this mutual acceptance of the PO may trigger another process at the supplier (305) to manufacture the widgets. Once the widgets are ready the supplier (305) sends an Advanced Ship Notice (ASN) to ACME (300) (step 210). The supplier (305) also sends shipping information to a third party logistics supplier (310), such as Fedex or UPS (step 212). In some implementations, the choice of the third party logistics provider (310) can be negotiated as part of the RFQ process. The third party logistics provider (310) picks up the widgets from the supplier and sends a shipping notice to ACME (300) and a copy of the shipping notice to the supplier (305), upon which the goods are delivered to ACME (300) (step 214). ACME (300) sends a receipt notice to the supplier (305) (step 216). When the supplier (305) receives the receipt notice, the supplier (305) knows that the widgets have been received by ACME (300) and sends an invoice for the widgets to ACME (300) (step 218). The sending of the invoice typically depends on the negotiated terms between ACME (300) and the supplier (305), so in some implementations, the invoice may be sent at a later time, or be paid in advance of the delivery of the widgets. Finally, ACME (300) pays the supplier (305) (step 220) and the business process ends.

The scenario described above with respect to FIGS. 2 and 3 describes a fairly complex business process involving multiple end-points of the interoperability network (106)

and multiple services on these end-points. On the other hand, certain other business processes can be very simple with only a single end point and a single service invocation. As will be described in further detail below, a Process Designer tool, which can be part of the interoperability network (106) allows users to compose both simple and complex business processes through a drag and drop graphical user interface (GUI). In one implementation the business processes can be constructed using a set of pre-defined widgets in the Process Designer tool, or by using services published in the directory of the interoperability network (106). Furthermore, a Process Execution engine that manages the execution of a business process and keeps track of which steps have occurred, and so on, can be provided in the interoperability network (106).

There are two types of processes in the context of the state of the process: processes that are stateful and processes that are stateless. Stateless processes are used primarily for application-to-application integration (such as integrating an SAP application with an Oracle application), where there is no need to keep information about the overall state of the process, such as what steps have been executed and what steps remain to be executed, and so on. Stateful processes, on the other hand, keep information about the process state and are required for business-to-business types of interactions, such as the one described above with respect to FIGS. 2 and 3. The interoperability network (106) supports both stateless and stateful processes. Typically, the user that designs the business process determines whether the business process should be stateful or stateless.

The business process described in FIGS. 2 and 3 runs over several steps and may take several days to finish. In one implementation, the Process Execution engine executes such long running business processes and manages the persistence of the state of the business process, including persistently storing the state of the process. The state of any running process includes the entire executable process definition for the process (a specific version), the input and output variables for each of the activities or steps in the process, and any global variables for the process. In one implementation, the business process is persisted to a database of the interoperability network (106) in situations where an asynchronous response is expected for an activity in the process, or in situations where there is a wait state defined in the process. In the business process described above, for example, the process instance is persisted after the RFQ is sent out to the suppliers in step 204. The stored process instance is restored from the database when a response is received for an activity or when a timer expires. The process then continues forward from the last point of persistence. A process is the definition of how the data should flow, where a process instance a set of data that is going through the process. The process is saved when it is being configured in Process Designer. The process instance is saved when state needs to be persisted. This is an important distinction to make because it ensures that multiple instances of the process may occur in parallel.

Another use of process state is to ensure that business processes are not lost in case of system failures or as a result of system downtime. When the system comes back up after a restart, the running process instances are restarted from the last point of persistence. In one implementation, when designing a process the user can choose specific persistence points for the process, at which the process and its state are stored. In another implementation, the process state is persisted after every step of the process. Having user configurable persistence points allows more optimized process execution and also enables users to have better control over other business activities such as transactionality. For example, in the business process of FIGS. 2 and 3, there is no need to persist the process until a response to the RFQ is received from a supplier (305) in step 206. If the process were to fail before a response is received in step 206, the entire process can be restarted from step 204 by resending all the RFQ's out to the suppliers (305). The process state is relevant for process constructs such as timeouts, expirations and transactions. In one implementation the Process Execution engine stores the state of the process in the database of the interoperability network (106) so that the process does not use-up any resources when waiting for a response.

User Roles or Personas Associated with Business Processes

There are typically a number of personas or user categories that are involved in the development of a business process. Some examples of different personas or user categories are: a business analyst, a developer, and an information technology (IT) administrator. A brief overview of these three types of personas will now be presented, although the reader should realize that these are merely exemplary, and many other personas or roles can be associated with a business process.

The business analyst is typically primarily responsible for defining the business processes using a Process Designer tool. The goal of the business analyst is to define the "outline" of the business process; that is, first perform Activity A, then B, then C, and so on. The business analyst is also responsible for defining the business level service legal agreement for the process; for example, the business process should be completed in x days, otherwise a business exception should be raised and an alternative action should be taken. The end result of the business analyst's work is an initial assembly of services according to the process followed for their particular businesses. The business analyst uses any means necessary to create the business process, including scanning the directory of the interoperability network (106) for necessary sets of services, and/or checking to see whether any additional services need to be created in order for the business process to be completely defined. In some cases no services are available to support the business process definition that the business analyst wants to use in the business process. In such cases the business analyst defines the process with sufficient annotations for the developer to implement the required service. The business analyst also defines the exceptions that may occur during the business process and the appropriate exception handling for them. Another task of the business analyst may be to monitor the business process once the business process has been deployed. The business analyst is typically only concerned with a particular type of business process and is interested in the "micro-view" of the business process. The analyst requires the ability to monitor the status of each individual business process in real-time and also the ability to generate historical reports of the already completed business processes. Using the historical reports, the business analyst can further refine and optimize the business process.

The developer takes the business process definition created by the business analyst and ensures that the business process can be executed. The developer is typically responsible for things such as: determining whether the appropriate connectors are available for services used in the business process, whether all the mappings needed for the process are available in the directory of the interoperability network or whether new mappings need to be created, what happens in case of system errors, whether any new connectors need to be created, whether any new services need to be created, and so on. The developer takes the fully implemented business process definition and tests it using debugging tools to ensure that the process is executable. At this point the business process is ready for use. The developer may need to go back to the business analyst to obtain her approval before deploying the process into production. Deployment of approved business processes may also be handled by an IT administrator. Sometimes, the same person can play both the roles of a business analyst and a developer while defining business processes, or there may be two different individuals who each have one role and work together very closely.

The IT administrator normally has no role in defining business processes, but is responsible for ascertaining that any additional services required by the business process get successfully deployed on the interoperability network. The IT administrator ensures that the designed business processes do not violate the organization's service legal agreement requirements and security requirements. Once the business processes get deployed the IT administrator is responsible for keeping the business processes running. She may not be concerned about individual steps of the business processes, but instead with the macro-view of the business process. IT administrators generate reports using various reporting tools. The reports can, for example, be used for billing purposes and for understanding the resource consumption. The IT administrator can make recommendations to the developer or the business analyst on how to optimize business processes but cannot directly make the changes in the interoperability network herself.

All the above user-personas listed work together and collaborate on the same process but are working on their respective area of the process. Depending on their privileges they will be able to make modification to the flow of the information in the process or make changes to how data gets sent between different steps in the flow.

Bottom-Up or Top-Down Design of Business Processes

The scenario described in FIGS. 2 and 3 above defines a very complex interaction between different end-points and services. A business analyst faced with the problem can use the Process Designer tool and drag-and-drop the necessary services together, wire the appropriate data flow and create the entire business process. This is a top-down approach to creating the business processes.

On the other hand, a long-running business process can be divided into several reusable pieces or components and a business process can be defined by wiring together these smaller reusable components. Using the scenario in FIGS. 2 and 3, the business process can be clearly divided into four stages: Quote or Bid (steps 202 through 206), buying (step 208), delivery (steps 210 through 216) and payment (steps 218 through 220). In an organization it is most likely that different individuals and/or departments are responsible for each of the individual stages. For example, the purchase department is likely responsible for the quote process for qualifying supplier and developing an approved vendor list, the manufacturing department is likely responsible for the actual purchase process, the shipping and handling department is likely responsible for the delivery and, finally, the accounting department is likely responsible for payment.

In such a situation, users from different departments can define their "portion" of the business process using the Process Designer tool. The business analyst then puts the individual portions together and creates the complete end-to-end business process. This approach is a bottom-up approach to creating business processes. The bottom-up approach to creating business processes allows different organizations or organizational units to focus on their core competencies and design processes that best suite their particular organizational structure and requirements. A benefit of the bottom-up approach is increased process reusability, so that a particular type of activity is not done differently by different departments or organizations. Another benefit is that change management becomes easier. When multiple business processes reuse the same "portions," changes to the business processes can be made in a single location and all the processes will automatically get the new process definition. In a bottom-up approach to business process creation, each of the "mini-process flows" are stand-alone business processes themselves that can get published on the interoperability network as services with a corresponding WSDL definition and associated security privileges and policies.

The bottom-up approach can also involve third party users. For example, consider a scenario in which a registered user, Joe V., of the interoperability network has defined a business processes for choosing suppliers which works as follows: The input to this exemplary bid process is a part number, a quantity and an expected delivery date. The bid process searches a parts catalog to find the suppliers for this particular type of part. The bid process also searches an online auction website to determine whether anyone is auctioning similar parts. The bid process then sends the necessary quote request, aggregates the responses, creates a best sourcing mix and returns this mix as a response. Joe makes his bid process available in the public directory of the interoperability network. A business analyst at the Acme company, used in explaining FIGS. 2 and 3, can decide to reuse Joe's bid process from the public directory because the bid process is adequate when defining the end-to-end buying process. This is another example of a bottom-up approach to defining business processes, in this case one of the services used is a third party service.

In one implementation, when reusing an already existing business process within another process, only a user with the appropriate security privileges can do so. The security privileges for a process can allow the user to invoke a process, to view a process, or to neither invoke nor view the process. If the process is viewable, the user has the option to use the process by reference, or to physically copy the processes into his own business process. Using the process by reference has all the benefits of reusing existing processes as described above. Physically copying the process and into another process breaks any link between the processes, and as a result changes made to one process are not reflected in the other process.

Furthermore, a process reused by reference in another process is executed as a child process. The child process has its own reporting for process data and status separate from the reporting of the parent process. Thus, when a business user or an IT user attempts to generate a report or monitor the status of a process, she will be able to drill down from the parent process into the child process only if she has the appropriate privileges. Otherwise the child processes will appear as a black box with only the aggregate roll-up data visible in the report.

In one implementation, the underlying definition of the business process, regardless of the manner in which the business process was created, is an XML representation. The XML code can be generated directly by users typing XML code to create one or more XML documents describing the business process. The XML code can alternatively be generated automatically based on user instructions entered through a graphical user interface, as will be described below. By having an XML-based business process, the portability of the business process can be ensured, as well as the ability to present different views and options to users of the business process, based on the users' privileges.

Process Design Tool User Interface

Figure 4:
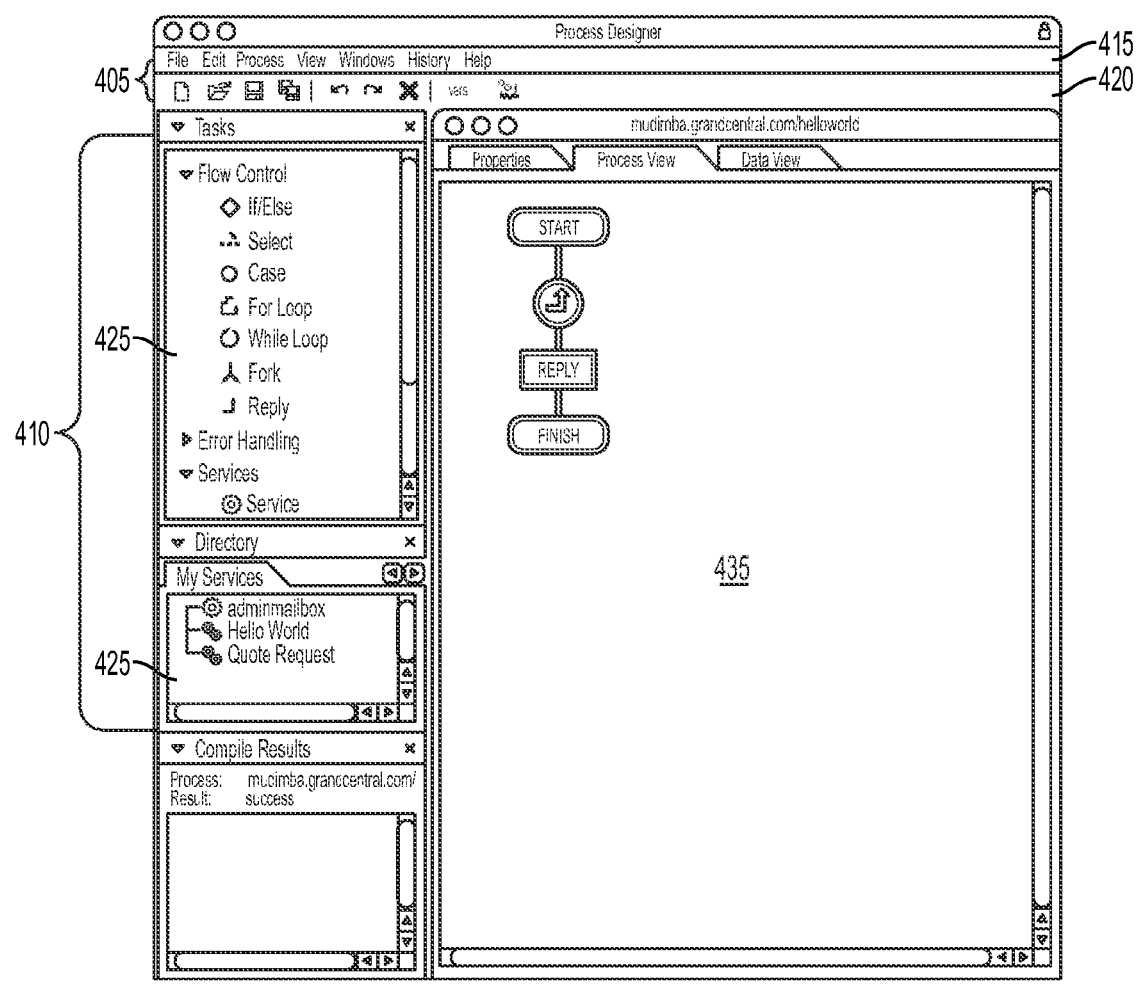
FIG. 4 shows the basic layout of the Process Express tool user interface

FIG. 4 shows the basic layout of one implementation of the Process Design tool user interface. The user interface (UI) of the Process Design tool is divided into two sections: the top menu (405) and the primary working area (410) below. The top menu (405) includes a Menu Bar (415) and the Tool Bar (420). The main working area (410) includes a set of open palettes (425) on the left. Process flows and other windows get opened on the right. The Process Design tool is a multi-window application that allows users to view and edit multiple process flows simultaneously. The primary use of the Process Design tool is to edit process flows, but the Process Design tool can also be used to create and edit endpoints on the interoperability network. The UI of one implementation of the Process Design tool allows the user to use keyboard shortcuts to perform tasks. Some features of the UI of the Process Design tool will now be described with reference to the drawings.

The Menu Bar (415) contains the menus File, Edit, Process, View, Windows, History and Help. The File menu contains commands for creating a new process, for navigating to a specific process flow, for saving one or more process flows, for compiling a process flow, for closing an open process flow, and for exiting the Process Design tool. The Edit menu contains commands for undoing a last change made by a user, for redoing changes that were undone, for deleting a particular node in a process flow, and for refreshing the Process Designer's directory cache. The process menu lets the user manage user-defined variables. The View menu allows a user to choose which palettes should be displayed, such as Widgets, Compile, and Directory palettes.

The Windows menu lists all the currently open process flow windows. When a user minimizes a particular window, the window is hidden. Selecting the particular window from the list of windows displays the window on top of any of the other open windows. If any of the open windows has content that has been edited a warning dialog box is displayed. The History menu lists processes that the user has recently viewed or edited, picking a given process will open the process in a new window. Finally, the Help menu contains a link to an online help location for the Process Design tool, and information about the version number and copyright information for the application.

The toolbar (420) lets users access functionality available in the Menu bar (415) more easily through a single click on an icon. The toolbar and menu items can be used interchangeably: for example the user can delete by using either the EDIT|DELETE menu item, or by using the delete button on the tool bar. This reverts the changes back. The buttons in the tool bar are: New, Open, Save, Save All, Undo, Redo, Delete, Manage User-Variables, and Compile.

Figure 5A:
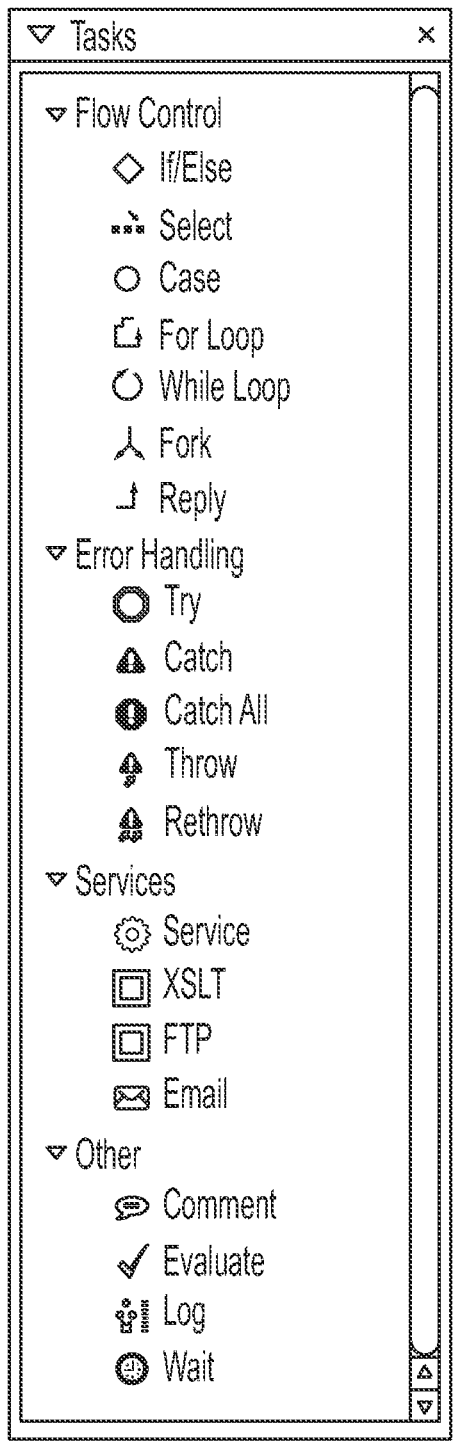
FIGS. 5A and 5B shows the layout of two different states of a Tasks palette.
Figure 5B:
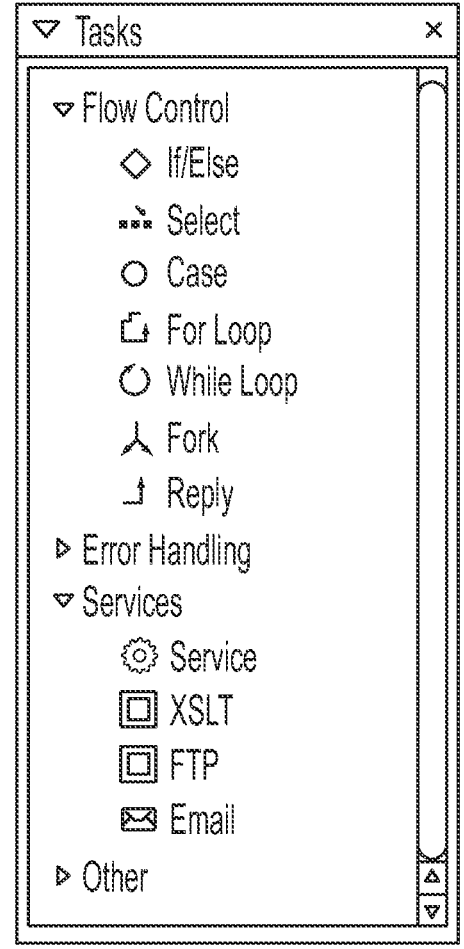

Palettes (425) are arranged along the left of the Process Express application. Palettes contain items that are used to construct a process flow. Palettes can be individually displayed or hidden. In the implementation shown in FIG. 4 there are three different palettes: Tasks, Directory and Compile Results. The Tasks palette provides all the tasks supported by the Process Design tool. The user can drag-and-drop a particular task from the Widget palette to the process flow. FIGS. 5A and 5B shows the layout of the tasks palette in two different states. The tasks supported by the Tasks palette are arranged in groups based on the type of action the task performs. FIG. 5A shows the Tasks palette with all the groups in their open states, and FIG. 5B shows the Tasks palette with the "Error Handling" and "Other" groups in their closed states. In one implementation the tabs in the widgets are:

Flow Control: Included in this tab are: If-then-else, Select, Case, For-loop, While-loop, Fork, and Reply.

Error Handling: Try, Catch, Catch All, Throw, and Rethrow.

Service: Service, XSLT, FTP, and Email.

Other: Comment, Evaluate, Log, and Wait.

In each group the name of the task is listed along side its icon. If the name is too long and cannot be displayed in the available space, a truncated name gets displayed. On mouseover the complete name for the task is displayed.

Figure 6:
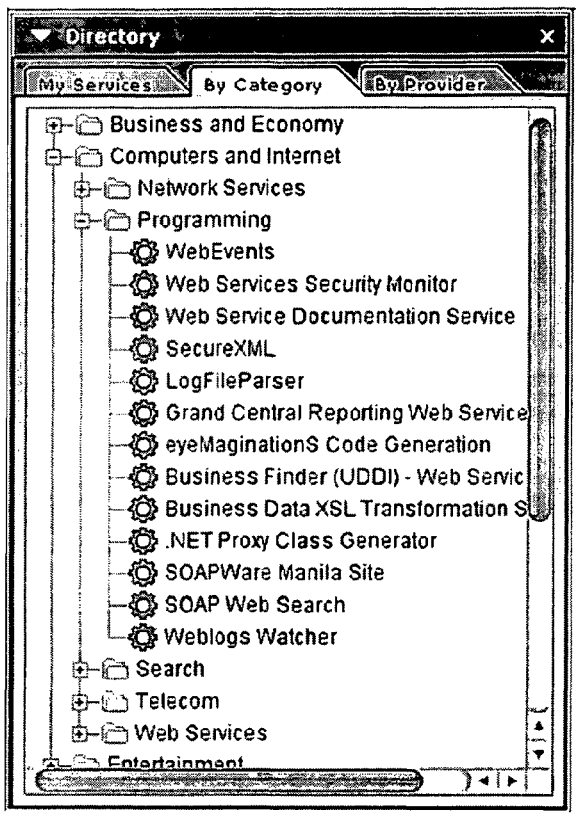
FIG. 6 shows a directory palette in accordance with the invention.
Figure 7:
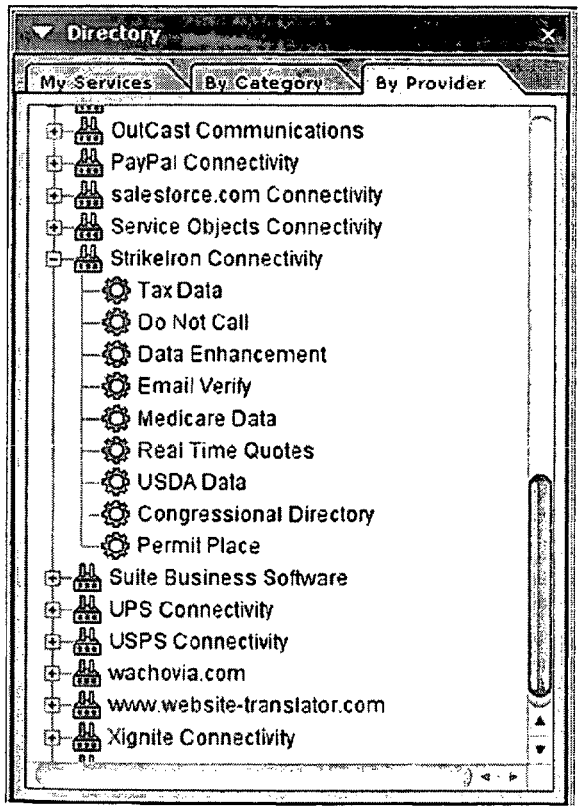
FIG. 7 shows a directory by Provider in accordance with the invention.
Figure 8:
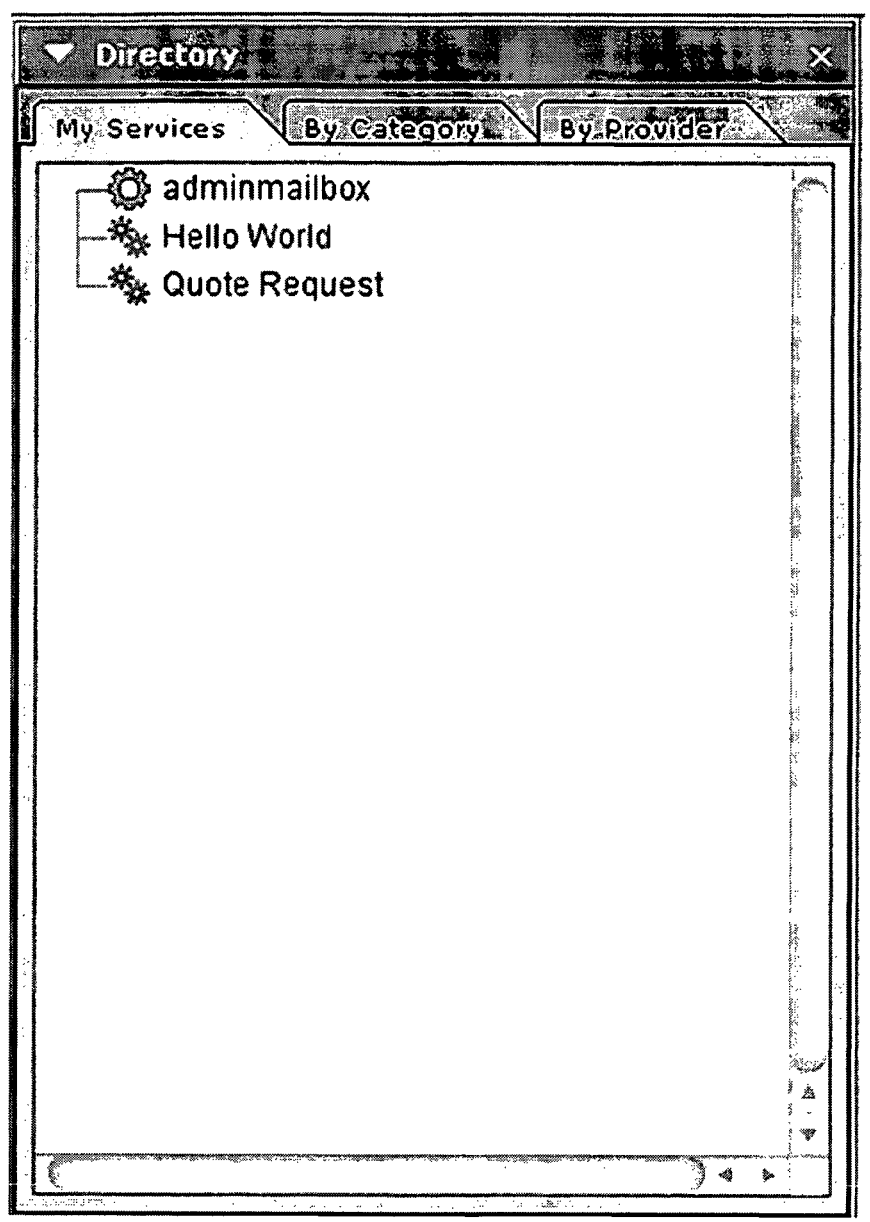
FIG. 8 shows a "My Services" view of the directory in accordance with the invention.

The directory palette is used to browse the directory of the interoperability network (106). The user can browse to a particular service within the directory and drag-and-drop the service into the process design. In one implementation the directory palette has 3 tabs: By Category, By Provider and My Services. The "By Category" tab displays the names of the services that the current user has permissions to see arranged by the category in which they fall. The name of the provider is displayed alongside the name of the service. FIG. 6 shows the directory palette open with the "By Category" tab selected. The "By Provider" tab displays the services in the directory by their provider. Only the services that the current user has permissions to see are shown in this tab. FIG. 7 shows the directory by Provider. The "My Services" tab displays the directory by the services that are owned by the current user's organization. FIG. 8 shows the "My Services" view of the directory.

In one implementation, a clipboard palette (not shown) is provided, which is used to place tasks that have been copied or cut from a process flow. Copying or cutting a task includes all the subtasks that fall below the particular task. The copied or cut task is displayed as icons and/or names in the clipboard. The user can drag-and-drop from the clipboard in to the process flow like dragging any other task icons. Dragging the icon from a clipboard into the Process Flow window (435) creates the entire sub-tree for the particular task in the process definition and removes the task from the clipboard. The user can also copy the task from the clipboard into the process flow window (435). The user can copy from the clipboard to the canvas multiple times. The user can also place multiple items in the clipboard. In one implementation, the Clipboard palette is normally hidden, but can be accessed from the View|Clipboard Menu item. When no tasks are placed in the clipboard, selecting the clipboard will display the clipboard in its closed state. The user has to explicitly open the Clipboard to see the contents when no items are present in the clipboard. When the user copies (or cuts) a task to the clipboard, the clipboard automatically expands. If the Clipboard is hidden when the user places something in the clipboard, the clipboard gets automatically displayed with the item placed in it.

Figure 8A:
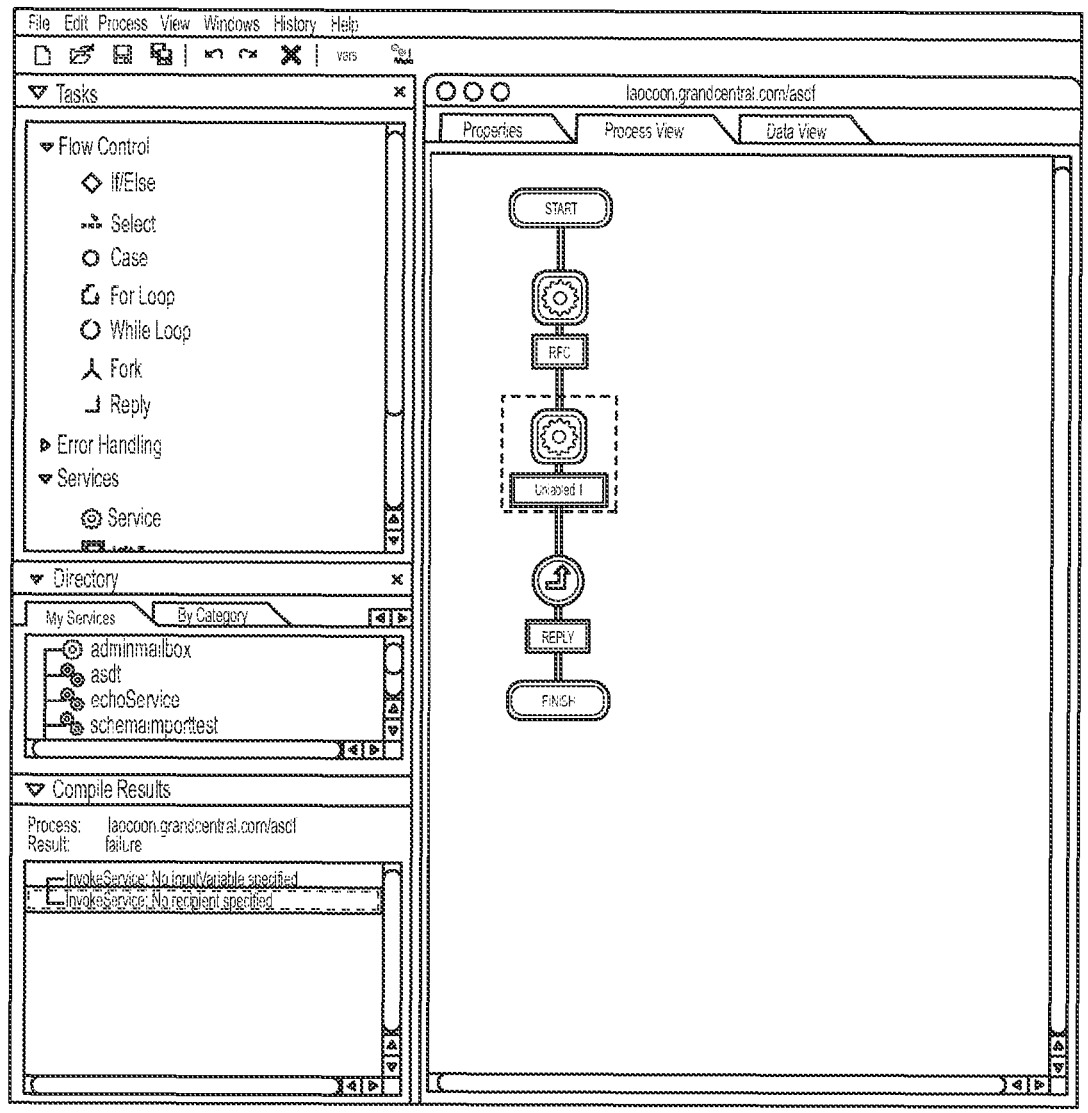
FIG. 8A shows a view of the Process Express tool UI, where a compile error has been selected.

The Compile Results palette lists compilation warnings and errors. When a user clicks on an error, the offending portion of the process flow is highlighted in the process view window. FIG. 8A shows a screenshot of the Process Design tool interface with a compile error selected in the Compile Results palette and displayed in the Process View window (435).

Figure 9:
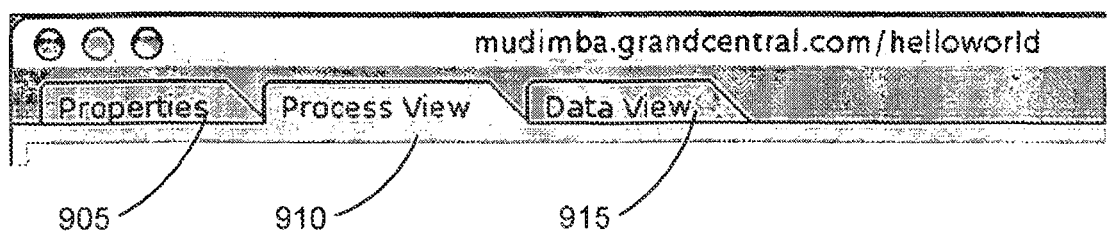
FIG. 9 shows different tabs for a single Process Flow.

The Process View window (435) is the main window for viewing and modifying process flows. Each process flow opens in its own separate window. Multiple process flows can be open simultaneously, each in its separate window. There are multiple separate views for a single process flow. These separate views are arranged as separate tabs along the top of an open process flow. FIG. 9 shows the different tabs for a single Process Flow, each tab represents a separate view for the particular process flow.

Figure 10:
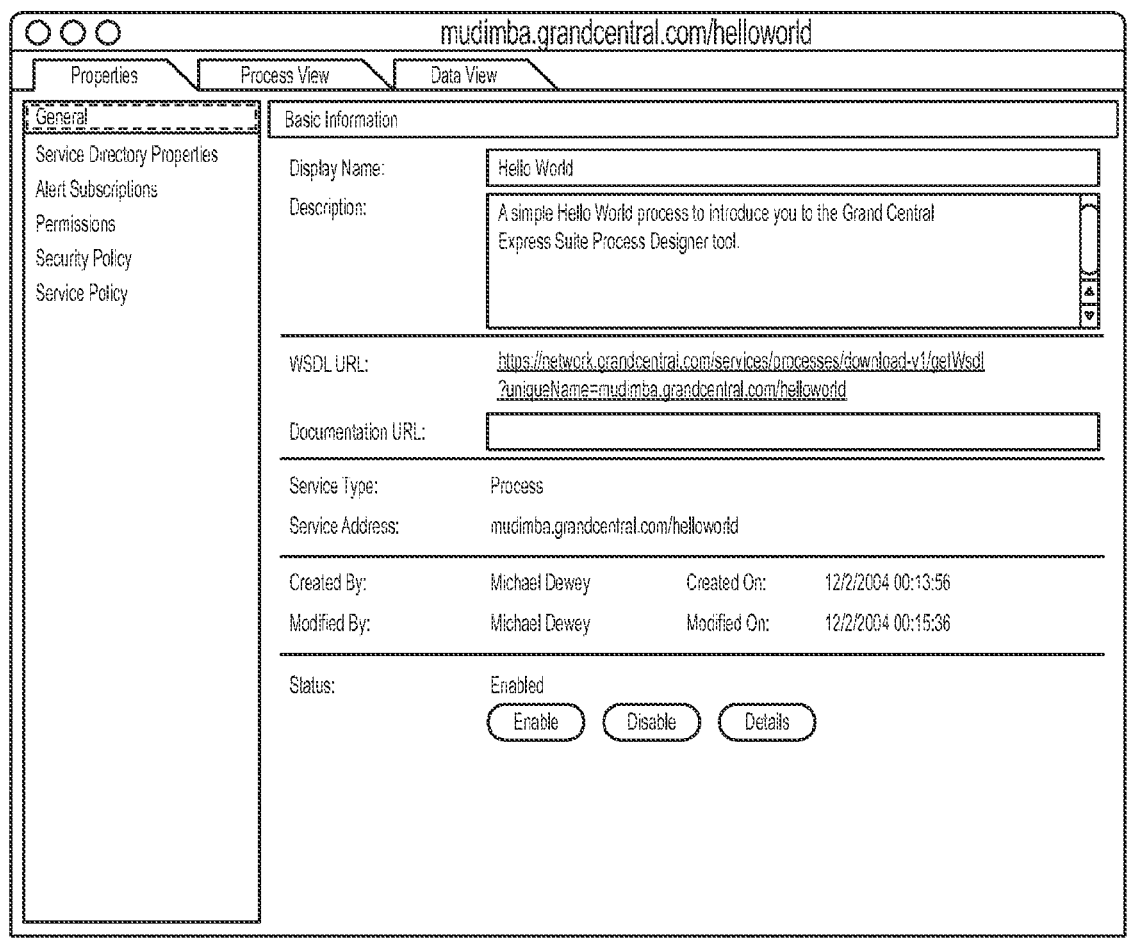
FIG. 10 shows a properties window for the Process Flow.
Figure 11:
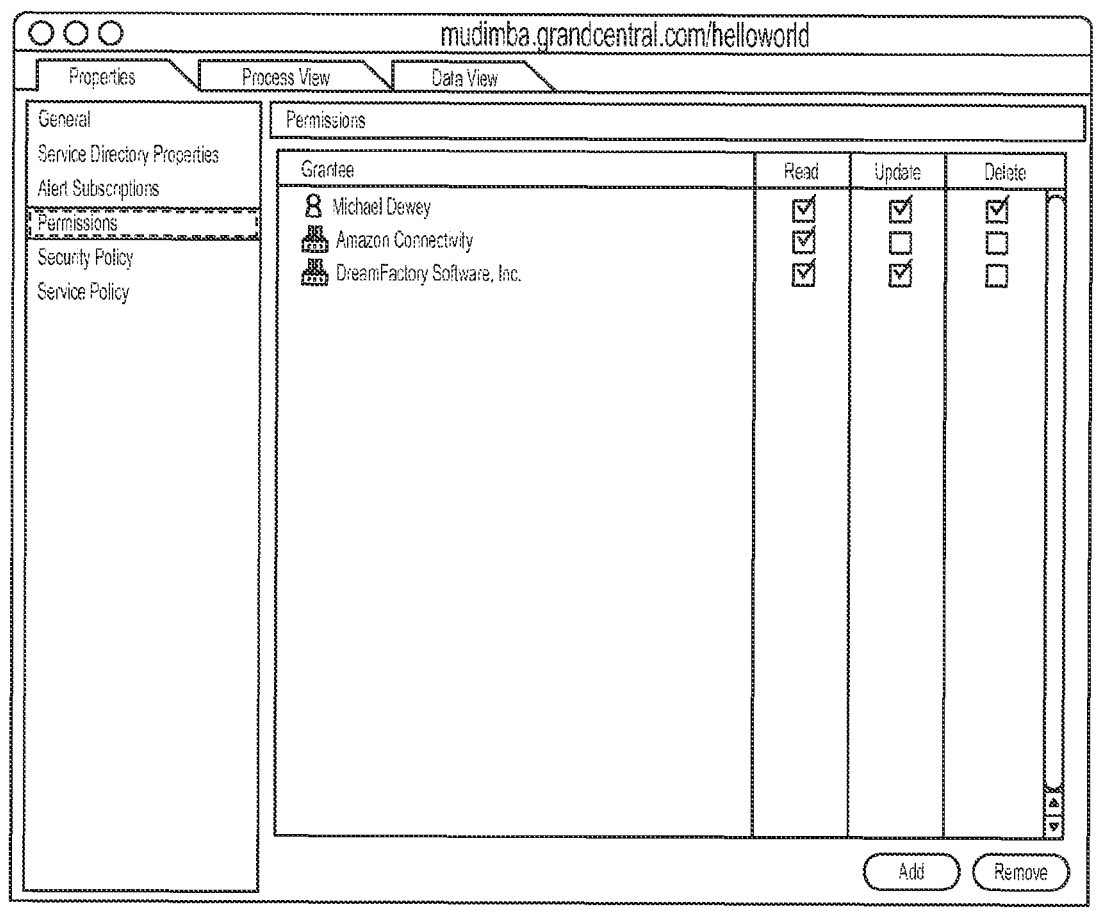
FIG. 11 shows the configuration for the permission for a process.
Figure 12:
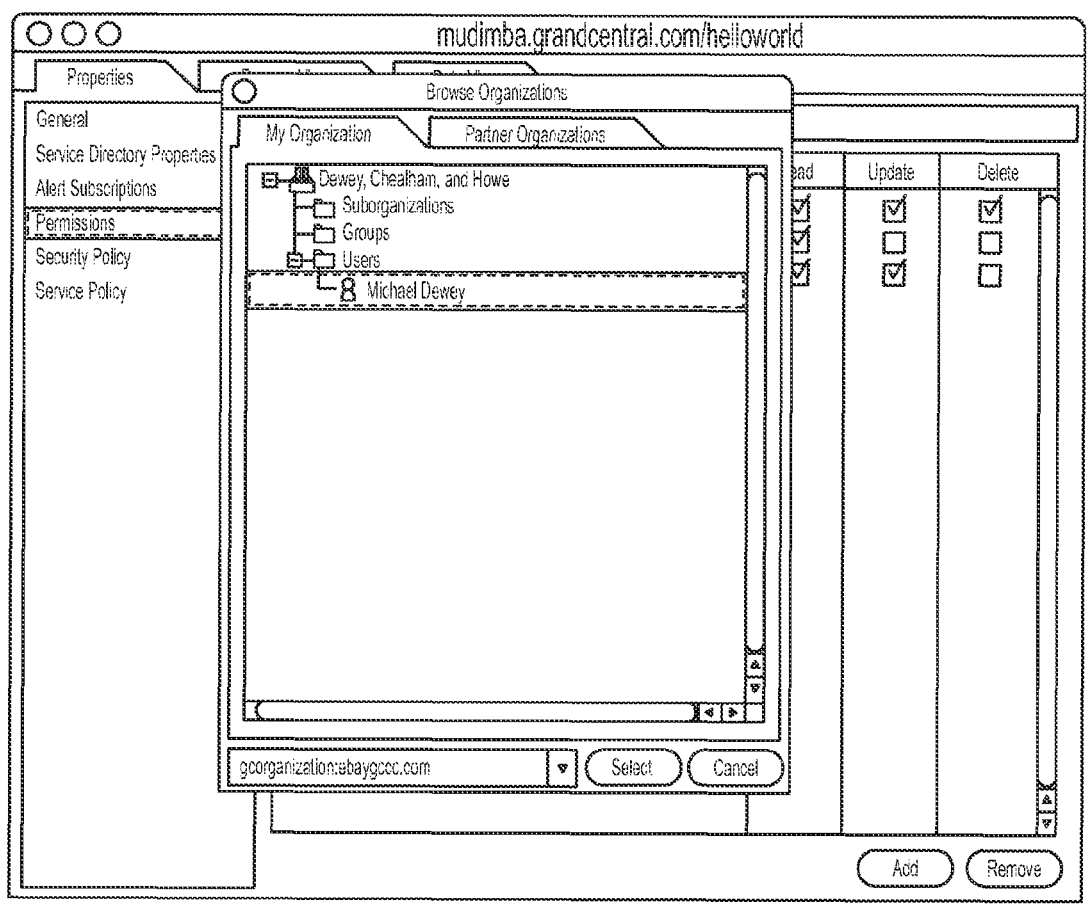
FIG. 12 shows a dialog box for changing permission for a process service.

The Properties tab (905) is the first tab for the process flow and lists the service properties of a process flow. All the attributes of a process flow apart from its process definition (such as Name, Description, Alert Subscriptions, Policy, Permissions, and so on) are displayed and configured through the properties tab. The data in the properties tab are arranged into groups for configuring and modifying the properties of the process flow. All the properties listed in the properties tab have default values and the user does not need to configure any of these properties unless she wants to override the default values. In one implementation, the groups of properties are as follows: General, Service Directory Properties, Alert Subscription, Security Policy and Permissions. These groups are arranged vertically along the left of the properties window (435). Clicking on one of the groups displays the currently set values for the process flow on the right. FIG. 10 shows the properties window (435) for the Process Flow. The General Properties include properties such as the name, description, service address, homepage URL, and status of the particular process. The Service Directory Properties shows the categories that the process flow is currently listed in and also allows the user to change its listings. The Security Policy allows the users to define the security policies for a particular process flow. The Alert Subscription lists the current set of alerts enabled for the process flow. The Service Permissions lists the Users, Groups and/or Organizations that have permissions to view and/or modify this particular process. The default values for a particular process are defined by the Organization to which the owner of the process belongs. FIG. 11 shows the configuration for the permission for a process. A user can change the permission by clicking on the Add or Remove buttons in the Permissions configuration and changing the users/groups or roles, as can be seen in FIG. 12. The Service Policy page lists the services, users and/or organizations that can call this process service.

Figure 13:
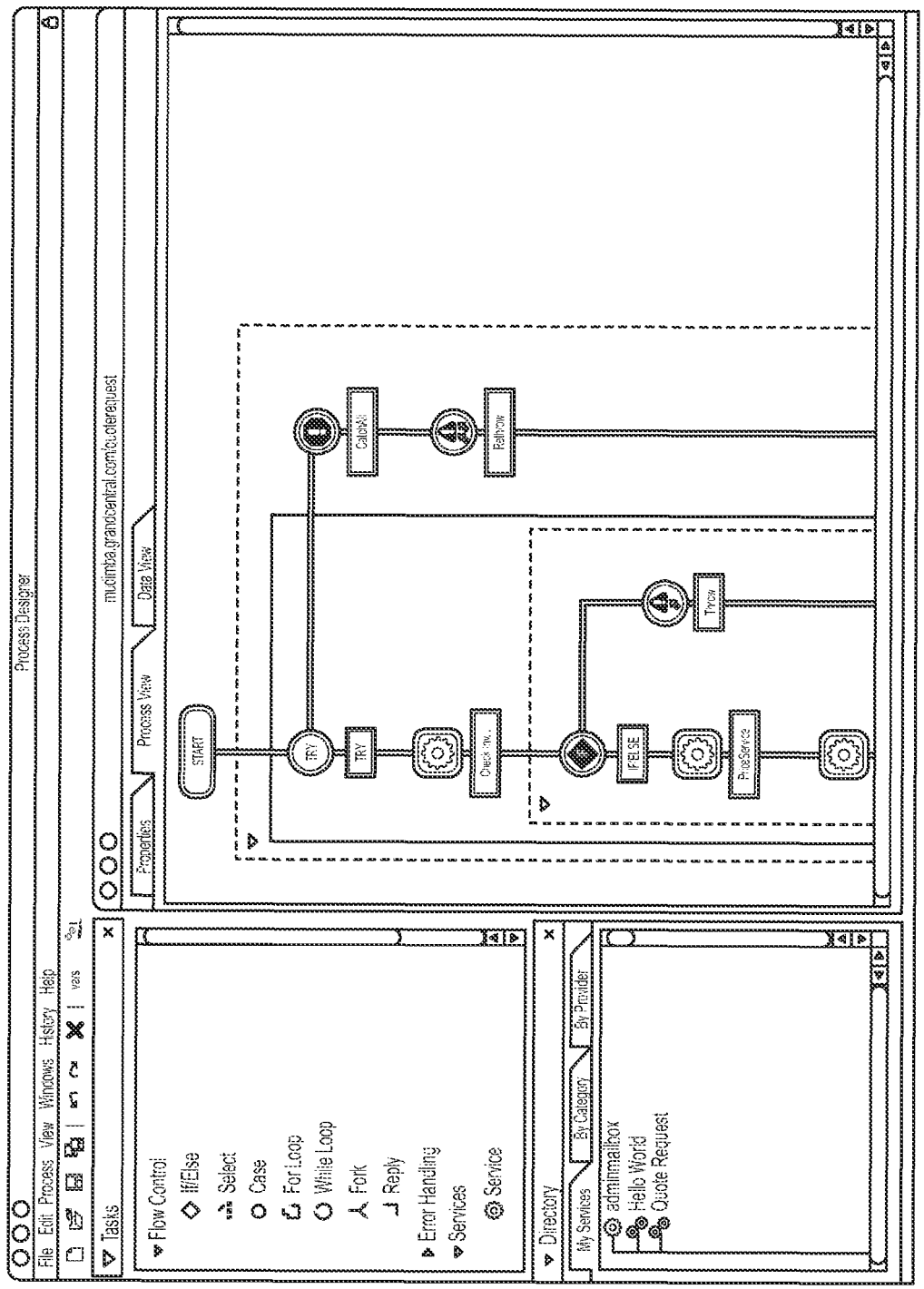
FIG. 13 shows an already existing process definition displayed in the process view.
Figure 14A:
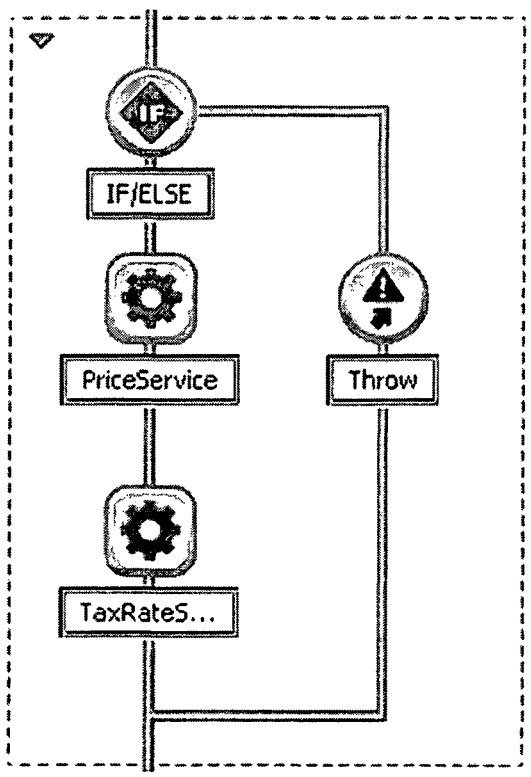
FIGS. 14A-14B shows a representation of an IF-THEN-ELSE task open and folded, respectively.
Figure 14B:
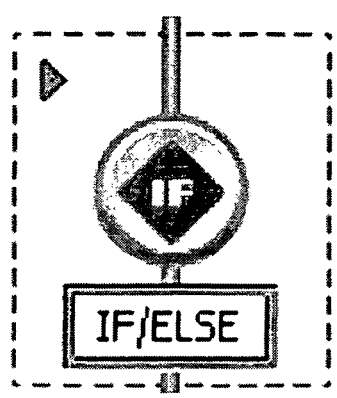

The Process View tab (910) is where the user defines the business process that she is trying to model. The process view allows the user to view and modify a process flow definition. The Process View is displayed graphically and denotes the chronological progress of a business process. FIG. 13 shows an already existing process definition displayed in the process view. The process view allows the user to drag-and-drop widgets from the widget palette or the directory palette (425) into the process flow window (435). In one implementation, the process view only allows the user to drop a particular icon onto an appropriate location in the process, thus preventing construction of an invalid flow. The appropriate locations in the process are highlighted as the user drags the icons into the process area. The process view also allows the user to change the visual display of sections of the process flow by folding or closing sections of the process flow. This improves the readability of the process definition. FIGS. 14A and 14B show an IF-THEN-ELSE task open and folded, respectively. Process folding is purely a UI construct and does not impact any underlying definition; the two versions of the process displayed in FIGS. 14A and 14B are identical. In one implementation, when the process flow is opened the first time all its branches are expanded. The user can choose to fold individual sections of the flow. The user can also name individual tasks in the process flow. The name is displayed below the task as shown in FIGS. 14A and 14B.

Figure 15:
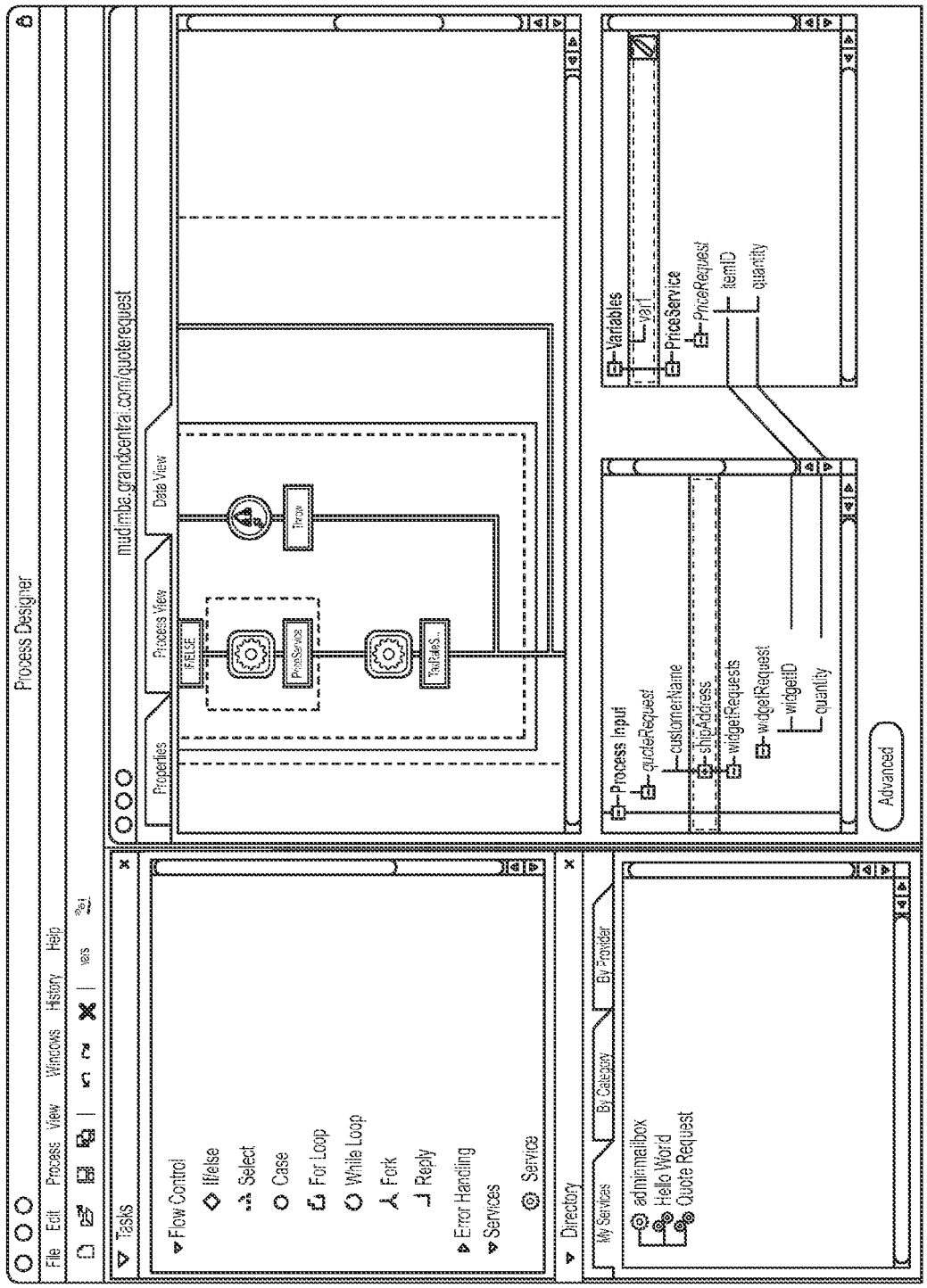
FIG. 15 shows a data view where a user can configure the flow of data between services for a business process flow.

The data view (915) shown in FIG. 15 is where the user configures the flow of data between individual services for a particular process flow. The data view window is vertically divided into two halves: the top half shows the process flow definition and the bottom half displays the data variables. The top half of the data flow is not editable. The only action the user can perform in the top half are to select a particular task or to expand or contract a particular section of the process flow. When the user selects a particular task in the top half, the expected inputs for the particular task and any process variables are displayed in the right-hand section. All the outputs of the upstream tasks before the particular selected tasks are displayed on the bottom left side. The user can set the inputs for that particular task by dragging and dropping from the outputs to the inputs. The user can also create complex mappings rules by clicking on the Rule icon besides the input node and creating an expression that defines the mapping.

Using the UI to Create a New Process Flow

Figure 16:
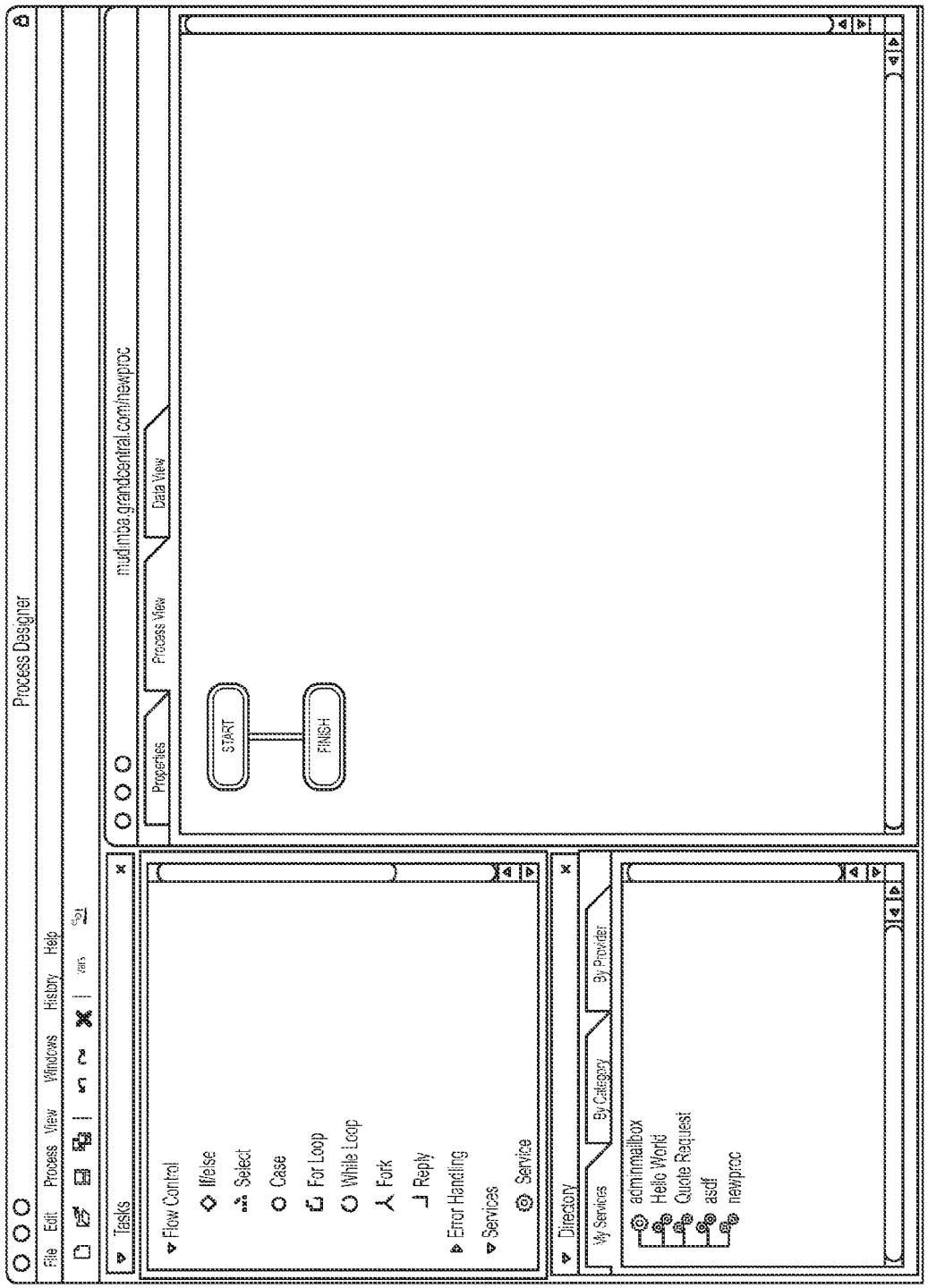
FIG. 16 shows an empty process flow.
Figure 17:
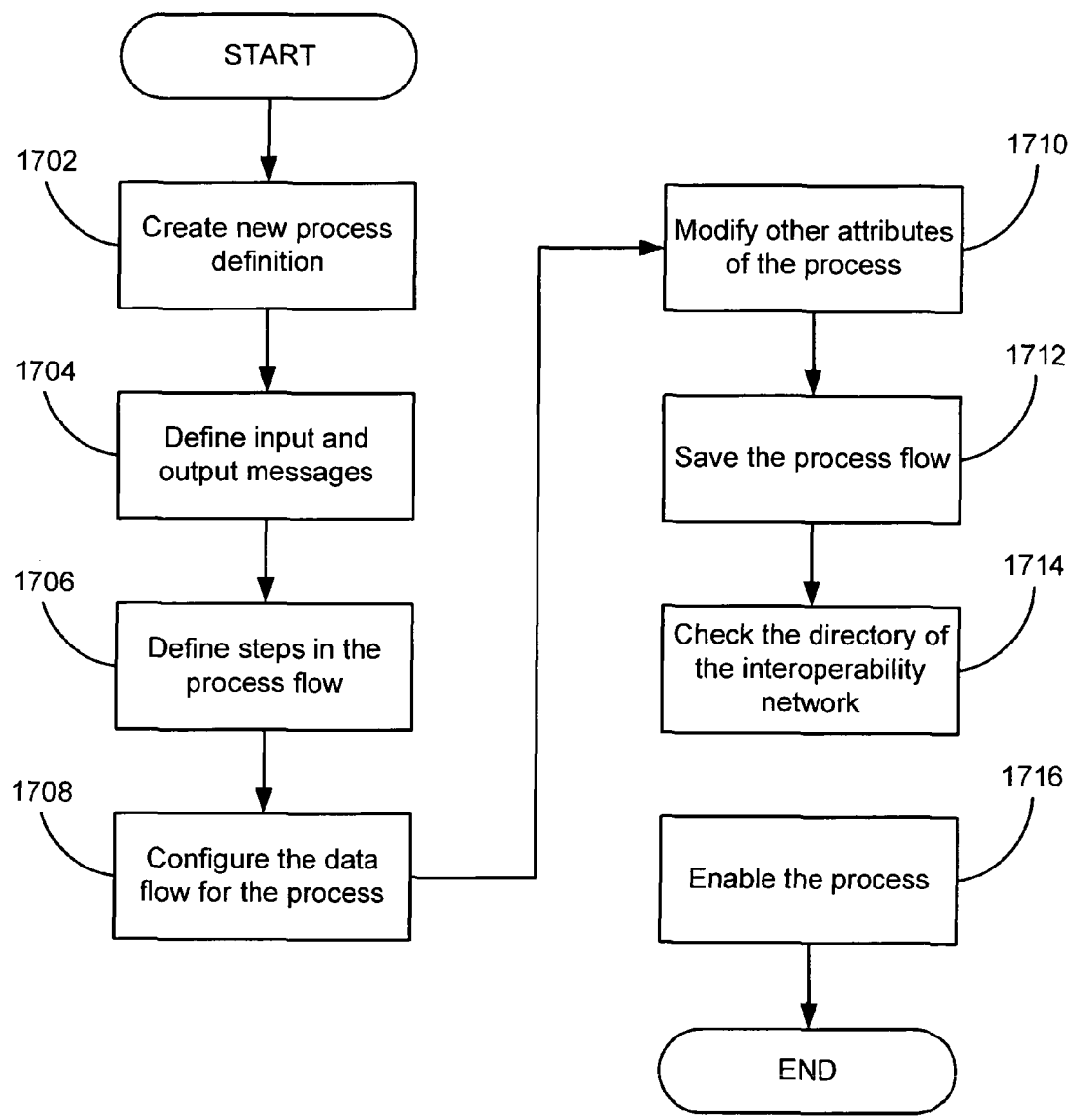
FIG. 17 shows a schematic flowchart for how a process can be created in accordance with the invention.

FIG. 17 shows a process for creating a new process flow using the Process Design tool. As can be seen in FIG. 17, the process starts by creating a new Process Definition using the FILE|NEW menu item. The user enters the name for the process flow, and an empty process flow as shown in FIG. 16 (step 1702). Next, the user defines an input message format for the process flow and an output message format for the process flow (step 1704).

When the input and output message formats have been defined, the individual steps in the process flow are defined by dragging and dropping from the Widget palette or Directory Palette, or copying from another process flow into the Process View window (step 1706). Each of the individual steps or tasks is then configured. In one implementation, a user's ability to configure the individual steps is based on the privileges that are stored for the particular type of user in the directory of the interoperability network (106). For example, a business user may have privileges to create an entirely new business process and select the necessary parameters for each step in the business process flow. A developer may have privileges to view the individual steps or blocks, open them up, and wire them together, but not move them to different locations. An IT user may neither modify any programming code associated with the overall business process or the individual steps, but can add comments to the various steps of the business process and modify security permissions associated with each step.

Next, the user clicks the data view tab and configures the input messages and variables for each task and for the entire process (step 1708). If needed, the user can then change the other attributes for the process by selecting the appropriate sections in the Properties tab (step 1710). The process flow is then saved using the FILE|SAVE option (step 1712).

After the process has been saved, the directory of the interoperability network can be refreshed, and the newly created service will be visible in the directory from the directory palette (step 1714). The user may also log into the Web UI to verify that the service exists and that a WSDL for the service has been created. Finally, the user clicks the "Enable Process" button in the Properties Tab (step 1716). This enables the newly created process and messages can now be sent to the process.

As can be seen from the above description, the directory of the interoperability network (106) has information about who the users are and what privileges they have, that is, which operations they can perform on the business process, and which views of the business process they will see. Another way to frame this feature is as a policy view feature, where the different user types have the ability to view their specific policies. The views are made possible by having a single underlying XML definition for the business process and selecting various parts of the XML representation to be displayed to the various users. In one implementation, what a user can view is determined by the particular role and associated privileges that have been assigned to the user. One of the privileges defines what type of view the user is allowed to see. For example, a business user may have a high-level process flow view. A developer can have permissions to see the blocks, open them up, and wire them together, but not move them. The IT user can neither modify the code or where the blocks are, but he can comment on the various steps of the business process. Any level of granularity in terms of organizational levels or roles can be used in the directory/repository.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations of the invention have been described. Nevertheless, it will be understood that various modifications may be made without departing from the spirit and scope of the invention. For example, the spirit of process flow and data mappings being distinct subsets of a process may be embodied by having drawers or separate windows as opposed to separate tabs. Accordingly, other embodiments are within the scope of the following claims.

What is claimed is:

1. A non-transitory computer-readable medium having computer instructions stored thereon that are capable of being executed by a computer system to cause operations comprising:

providing, by a system, a workflow design tool user interface operable to allow one or more users to perform operations associated with designing workflows;

storing, by the system, user information for the one or more users in a central repository that is accessible through a network, wherein the user information specifies, for a plurality of users, user privileges to perform, during the design of a particular workflow, one or more of the operations associated with designing workflows, wherein the user privileges include a first set of user privileges for a first one of the plurality of users and a second set of user privileges for a second one of the plurality of users, wherein the first set differs from the second set, and wherein the second set of user privileges specifies that the second user is allowed to incorporate third-party components from a public directory into workflows;

receiving, by the system, a plurality of requests to perform operations associated with designing the particular workflow, wherein the plurality of requests are received through the workflow design tool user interface and includes requests from at least the first and second users; and determining, by the system, whether to permit the plurality of requests based on the user privileges stored for the particular workflow, wherein the determining includes:

assessing the requests from the first and second users using the first and second sets of user privileges, respectively; and permitting operations requested by at least two of the plurality of users, wherein one of the operations includes incorporating a third-party component from the public directory into the particular workflow.

2. The computer-readable medium of claim 1, wherein the first user is associated with a role and the role has the first set of user privileges.

3. The computer-readable medium of claim 2, wherein the first set of user privileges for the first user represents a default set of user privileges.

4. The computer-readable medium of claim 2, wherein the role is one of: a business analyst role, a developer role, an information technology professional role, a quality assurance tester role, a security or business auditor role, and a performance analyst role.

5. The computer-readable medium of claim 2, wherein the first set of user privileges are based on a role of the first user.

6. The computer-readable medium of claim 1, wherein the user privileges include privileges to do one or more of: creating a new workflow, viewing an existing workflow, modifying an existing workflow, importing elements of one workflow into another workflow, copying elements from one workflow into another workflow, and viewing reports generated by the workflow.

7. The computer-readable medium of claim 1, wherein the first user is designated as an owner of the particular workflow, and wherein the second set of user privileges is a default set of user privileges, wherein the default set of user privileges is specified by the first user.

8. The computer-readable medium of claim 1, wherein the first set of user privileges is based on a status of completion of the particular workflow.

9. The computer-readable medium of claim 1, wherein the network is an interoperability network including functionality for routing messages through the interoperability network, and functionality for mediating differences in communication protocol formats between users, services, and computer applications involved in the particular workflow.

10. The computer-readable medium of claim 1, wherein the user privileges relate to viewing the particular workflow, and wherein a type of operation requested by the first user includes viewing of the particular workflow.

11. The computer-readable medium of claim 1, wherein the user privileges relate to modifying the particular workflow, and wherein a type of operation requested by the second user includes modifying the particular workflow.

12. The computer-readable medium of claim 1, wherein the user privileges associated with the particular workflow are specified by the first user and further specify:

an indication of one or more additional users allowed to collaborate with the first user to create the particular workflow, and an indication of which of a plurality of operations related to creation of the particular workflow each of the one or more additional users are allowed to perform.

13. A method, comprising:

providing, by a system, a workflow design tool user interface operable to allow one or more users to perform operations associated with designing workflows;

storing, by the system, user information for the one or more users in a central repository that is accessible through a network, wherein the user information specifies, for a plurality of users, user privileges to perform, during the design of a particular workflow, one or more of the operations associated with designing workflows, wherein the user privileges include a first set of user privileges for a first one of the plurality of users and a second set of user privileges for a second one of the plurality of users, wherein the first set differs from the second set, and wherein the second set of user privileges specifies that the second user is allowed to incorporate third-party components from a public directory into workflows;

receiving, by the system, a plurality of requests to perform operations associated with designing the particular workflow, wherein the plurality of requests are received through the workflow design tool user interface and includes requests from at least the first and second users; and determining, by the system, whether to permit the plurality of requests based on the user privileges stored for the particular workflow, wherein the determining includes:

assessing the requests from the first and second users using the first and second sets of user privileges, respectively; and permitting operations requested by at least two of the plurality of users, wherein one of the operations includes incorporating a third-party component from the public directory into the particular workflow.

14. The method of claim 13, wherein the first set of user privileges is based on a status of design completion for the particular workflow.

15. The method of claim 13, wherein the first user is an owner of the particular workflow, and wherein the second set of user privileges are specified by the first user.

16. The method of claim 13, wherein the first set of user privileges allows the first user to comment on the particular workflow but not make any modifications to the particular workflow.

17. The method of claim 13, wherein the first set of user privileges allows the second user to modify how data gets sent between different steps in the particular workflow.

18. The method of claim 13, wherein the particular workflow is defined using an extensible markup language.

19. An apparatus, comprising:

a computer processor; and a memory having computer instructions stored thereon that are capable of being executed by the computer processor to cause operations comprising:

providing, by the apparatus, a workflow design tool user interface operable to allow one or more users to perform operations associated with designing workflows;

storing, by the apparatus, user information for the one or more users in a central repository that is accessible through a network, wherein the user information specifies, for a plurality of users, user privileges to perform, during the design of a particular workflow, one or more of the operations associated with designing workflows, wherein the user privileges include a first set of user privileges for a first one of the plurality of users and a second set of user privileges for a second one of the plurality of users, wherein the first set differs from the second set, and wherein the second set of user privileges specifies that the second user is allowed to incorporate third-party components from a public directory into workflows;

receiving, by the apparatus, a plurality of requests to perform operations associated with designing the particular workflow, wherein the plurality of requests are received through the workflow design tool user interface and includes requests from at least the first and second users; and determining, by the apparatus, whether to permit the plurality of requests based on the user privileges stored for the particular workflow, wherein the determining includes:

assessing the requests from the first and second users using the first and second sets of user privileges, respectively; and permitting operations requested by at least two of the plurality of users, wherein one of the operations includes incorporating a third-party component from the public directory into the particular workflow.

20. The apparatus of claim 19, wherein the first set of user privileges is based on a status of design completion for the particular workflow.

* * * * *